United States Patent [19]

Davidson et al.

[11] Patent Number: 5,023,868
[45] Date of Patent: Jun. 11, 1991

[54] AUTOMATED CALL HANDLING APPARATUS

[75] Inventors: Wayne A. Davidson, Winfield; Diana S. Winter, Chicago, both of Ill.

[73] Assignee: AT&T Bell Laboratories, Murray Hill, N.J.

[21] Appl. No.: 504,711

[22] Filed: Apr. 3, 1990

Related U.S. Application Data

[63] Continuation-in-part of Ser. No. 291,922, Dec. 29, 1988, abandoned.

[51] Int. Cl.[5] .................. H04Q 11/04; H04J 3/12; H04M 11/00
[52] U.S. Cl. ...................... 370/62; 370/58.2; 370/110.1; 379/93; 379/94; 379/112; 379/158; 379/211
[58] Field of Search ............ 370/110.1, 60, 60.1, 370/58.1, 58.2, 58.3, 62; 379/93, 94, 96, 112, 156, 157, 158, 211, 212, 213, 214, 215

[56] References Cited

U.S. PATENT DOCUMENTS

| | | | |
|---|---|---|---|
| 4,048,452 | 9/1977 | Oehring et al. | 179/27 |
| 4,436,962 | 3/1984 | Davis et al. | 179/18 |
| 4,436,963 | 3/1984 | Cottrell et al. | 179/18 |
| 4,476,349 | 10/1984 | Cottrell et al. | 179/18 |
| 4,559,416 | 12/1985 | Theis et al. | 179/7.1 R |
| 4,592,048 | 5/1986 | Beckner et al. | 370/60 |
| 4,599,493 | 7/1986 | Cave | 179/18 |
| 4,653,085 | 3/1987 | Chan et al. | 379/94 |
| 4,656,623 | 4/1987 | Dalby, Jr. et al. | 379/94 |
| 4,661,975 | 4/1987 | Brecher | 379/215 |
| 4,694,483 | 9/1987 | Cheung | 379/112 |
| 4,712,230 | 12/1987 | Rice et al. | 379/112 |
| 4,723,273 | 2/1988 | Diesel et al. | 379/211 |
| 4,734,931 | 3/1988 | Bourg et al. | 379/93 |
| 4,739,509 | 4/1988 | Bourg | 379/93 |
| 4,741,026 | 4/1988 | Baxter et al. | 379/158 |
| 4,748,656 | 5/1988 | Gibbs et al. | 379/94 |
| 4,757,529 | 7/1988 | Glapa et al. | 379/244 |
| 4,763,353 | 8/1988 | Canale et al. | 379/157 |
| 4,876,717 | 10/1989 | Barron et al. | 380/25 |
| 4,922,484 | 5/1990 | Yoshida et al. | 370/110.1 |

OTHER PUBLICATIONS

AT&T, "Call Management System (CMS)", PM-4495 F/HG, 1987, brochure.
AT&T, "5ESS TM Switch ISDN Basic Rate Interface Specification 5E4 Generic Program", AT&T 5D5-90-0-301, 1985.
Strathmeyer, C., "Voice/Data Integration: An Applications Perspective", vol. 25, No. 12, Dec., 1987, *IEEE Communications Magazine*, pp. 30-35.

*Primary Examiner*—Douglas W. Olms
*Assistant Examiner*—Alpus H. Hsu
*Attorney, Agent, or Firm*—Peter Visserman; Werner Ulrich

[57] ABSTRACT

A computer connected to an ISDN switch via an ISDN digital subscriber line, has shared call appearances with a number of telephone stations connected to the switch and on the basis of shared call appearance associated messages from the switch, controls the forwarding of calls directed to the stations with which it has a shared call appearance. The associated messages are interpreted by the computer, which generates station status information. The computer responds to messages associated with predefined ones of the stations to select an alternate destination for the call and to transmit ISDN messages to the switch to cause the call to be forwarded to the selected alternate destination. Calls may be forwarded depending on call type, called number or other criteria. The computer responds to calls forwarded to it in the event that an associated station is busy and connects a holding party to the principal phone when the principal phone is no longer busy. The computer may be connected simultaneously to several ISDN switches via ISDN subscriber lines to receive shared call appearance associated messages from the several switching systems and forward calls for a telephone station connected to one switch, to a telephone station connected to another switch.

34 Claims, 18 Drawing Sheets

AUTOMATED CALL HANDLING APPARATUS

This application is a continuation-in-part of application Ser. No. 291,922, filed on Dec. 29, 1988, now abandoned.

CROSS-REFERENCE TO RELATED APPLICATION

The following U.S. applications, which are assigned to the assignee of the instant application and filed concurrently herewith, have related subject matter:

(1) Telephone Agent Call Management System: by W. A. Davidson and D. S. Winter, Ser. No. 07/291,813.

(2) Telephone Agent Management Information System: by W. A. Davidson and S. Hossain, Ser. No. 07/291,814.

FIELD OF INVENTION

The invention relates to the performing of telephone call handling functions for a telephone subscriber on an automated basis. More particularly, it relates to the use of a computer connected to an ISDN switch for performing such functions.

Further, the invention relates to message recording systems and more particularly to an arrangement for information transfer between such a system and a telecommunication switching system.

BACKGROUND OF THE INVENTION

Telephone answering machines are devices that perform call handling on an automated basis. Their limitations, however are well-known. For example, standard telephone answering machines require special circuitry for detecting the off-hook condition of the associated station and cannot provide an answering service when the line with which it is associated is busy. Other call coverage arrangements are known by which a telecommunication switching system such as a central office switch or a PBX switching system on a customer premises forwards incoming telephone calls to another number. The calls may be forwarded to an alternate destination, such as a telephone answer desk or voice mail system, when the principal telephone does not answer, is busy, or has activated a feature forwarding all calls. In one prior art system, a personal computer is interposed between a telephone station and a business communication system on a customer's premises. In that arrangement, the computer intercepts all call signaling from the communication system and creates a record of the calls.

A problem with the prior art arrangements where functions such as call forwarding are performed by the switching system is that they tend to be expensive for smaller companies which may not have a private system on their premises. A problem with prior art arrangements using a computer interposed between a station and the switch on a per-line basis is that the capabilities of the computer are limited to functions that can be performed by monitoring the signal activity on a single line. Such a computer has limitations similar to a standard telephone answering machine in that it cannot provide call handling services while the line with which it is associated is busy.

Voice message recording systems are commonly used in connection with telecommunication switching systems such as central offices or customer premises private branch exchanges (PBXs). Besides receiving a voice message from the telecommunication system, the more sophisticated voice message recoding systems receive information from the telecommunication system, including information identifying the called party or called party directory number. This information is used in the voice messaging system to provide a customized announcement to the calling party and to record the message with indices which allow for easy retrieval. The transmission of called party information may also be used by business offices or service bureaus in which telephones are answered by human operators and messages are recorded by the operator's entry of information provided by the caller in a data base which may be retrieved at a later time by the called party.

Some systems have a large number of users; several thousand users are typically served from a central office by means of a specially designed data link of the switching system over which the switching system transmits the appropriate information to the message recording system. The link may also be used by the recording system to transmit to the switching system information used by the switching system to activate a message waiting light on the equipment of the called subscriber.

A separate data link is not needed when the message recording system is provided with a dedicated line for each client. In that case, the switching system simply transfers the call to the dedicated line in case the subscriber is busy or unavailable and the recording system or service bureau does not need separate information since the identity of the line identifies the client to the call answering and recording system. Such an arrangement is economical only for systems handling a small number of clients. In other systems, typically PBX's, several clients share a single line to the message system and the switching system is modified to outpulse the called number on that line prior to making the voice connection for answering and recording message information. In other less sophisticated message recording systems, no information with respect to the called party is transmitted from the switching system and the calling party, by announcement, is asked to dial (using a dual tone multifrequency (DTMF) station) the called party number and the messages are stored by number. Alternatively, the calling party may be asked to speak the name of the called party and a message is retrieved by listening to the names at the beginning of each message.

A problem of the prior art is that in large central message recording systems, which are much more economical than an aggregate of smaller systems, an especially designed data link adds a substantial expense to the system, particularly at the low end of the larger systems. Furthermore, telephone switching systems typically have a limited number of data ports and at least one such data port is required for each voice system that may be connected to a switch in a central office; the number of message systems connected to one central office may be several thousand. Furthermore, the arrangement using the special data link, as well as certain of the other prior art arrangements require special software in the switch which further adds to the expense of providing the service.

SUMMARY OF THE INVENTION

The problems of prior art systems are overcome and a technical advance is achieved in accordance with the principals of this invention by means of a computer connected to a telecommunications switching system which transmits to the computer associated messages corresponding to call handling information exchanged between the switching system and stations connected thereto. The computer responds to an associated message indicating an incoming call to one of the stations by selecting an alternate destination station and transmitting digital messages to cause the switching system to transfer the incoming call to the selected alternate destination. In one embodiment of the invention, the switching system is adapted for the Integrated Services Digital Network (ISDN) and the computer is connected to the switch via a standard ISDN subscriber line. The computer monitors ISDN messages for a plurality of telephone stations by means of the shared call appearance feature available in ISDN switches and performs call handling functions for a plurality of telephone stations on the basis of information contained in the received messages. Advantageously, the computer can perform these functions independent of the busy or idle state of the station being served and no special equipment such as answer detection circitry is required since the computer is connected to the switch via an ISDN subscriber line and the data being monitored reflects the information available in the switch.

In accordance with one aspect of the invention, the computer forwards incoming calls in accordance with predefined criteria. Calls may be forwarded in accordance with call type or on the basis of the identity of the calling number or other criteria. Advantageously, with this capability, certain calls may be routed to a station where they may be answered by, for example, an associate of the principal or the principal's secretary and other calls may be routed to a voice mail system or the like. Similarly, calls from a particular calling number or from a specified area code may be forwarded to specified stations.

In accordance with another aspect of the invention, the computer provides individual call coverage in that a first principal may have calls forwarded to a second station and in the event that there is no answer at the second station then to a third station. A second principal may have calls forwarded to the second station as well and in the event that there is no answer or other conditions exist have the call forwarded to a fourth station.

In accordance with yet another aspect of the invention, the computer can screen a call forwarded by the switch when the principal telephone station is busy. In such a case the computer answers an incoming call with a recorded message which may prompt a caller to dial certain indicated digits if the caller wishes to leave a message or if the caller wishes to hold or if a caller wishes to interrupt the principal. The computer can then provide an indication, such as an electronic message to the display screen associated with the principal station, to indicate to the principal the nature of the incoming call answers well as the identity of the caller.

In accordance with yet another aspect of the invention, the computer generates a list of unanswered calls on the basis of the received associated messages.

In accordance with another aspect of the invention, the computer is connected to several switching systems, and, on the basis of associated messages from the several systems, selects an available alternate station connected to one switching system to receive a call directed to a station connected to another of the switching systems.

In further accordance with this invention, the problems discussed with respect to message recording and other problems of the prior art are overcome by a control interface for interfacing a telecommunication switching system with a message recording system, and the connection of a shared directory number telephone line, which provides call destination information in accordance with a standard telephone line protocol, for calls extended to the message recording system; the interface comprises control means responsive to information received on the telephone line for extracting from the received information call destination information pertaining to a call extended to the message recording system and for transmitting the extracted call destination information to the message recording system. The interface shares the directory number of each of a plurality of analog lines connecting the switch of the switching system to the voice message system. Advantageously, this arrangement uses a standard telephone line and an available shared directory number feature of the telecommunication switching system instead of the prior art high cost data link connected to data ports of the switching system, which are customarily limited in number.

In accordance with a specific embodiment of the invention, the interface is incorporated in a standard ISDN telephone set and takes advantage of existing ISDN line interface circuitry.

Further, in an embodiment of the invention the interface includes a memory for storing directory number data in association with call appearance data and control means responsive to information received on the telephone line to obtain from the memory a directory number stored in association with call appearance data defined by the received information and to transmit the directory number to the message recording system, for use by the message recording system.

Advantageously, in accordance with this invention an interface is provided between a telecommunication system and using a standard telephone line and telephone circuitry modified to be responsive to messages in a standard telephone format to transmit messages to the message recording system in a standard message recording system format, such as the commonly used SMSI format.

Furthermore, the interface distinguishes between messages relating to calls forwarded to the message recording system for recording and direct calls to the message system for purposes of retrieving messages and sends appropriate control messages to the message recording system.

Advantageously, the interface is also responsive to messages from the message recording system defining activation or deactivation of a message waiting indicator to transmit such messages to the telecommunication switching system in the standard telephone format.

BRIEF DESCRIPTION OF THE DRAWING

The invention may be better understood from the following detailed description when read in conjunction with the drawing in which.

DETAILED DESCRIPTION

Figure 1:
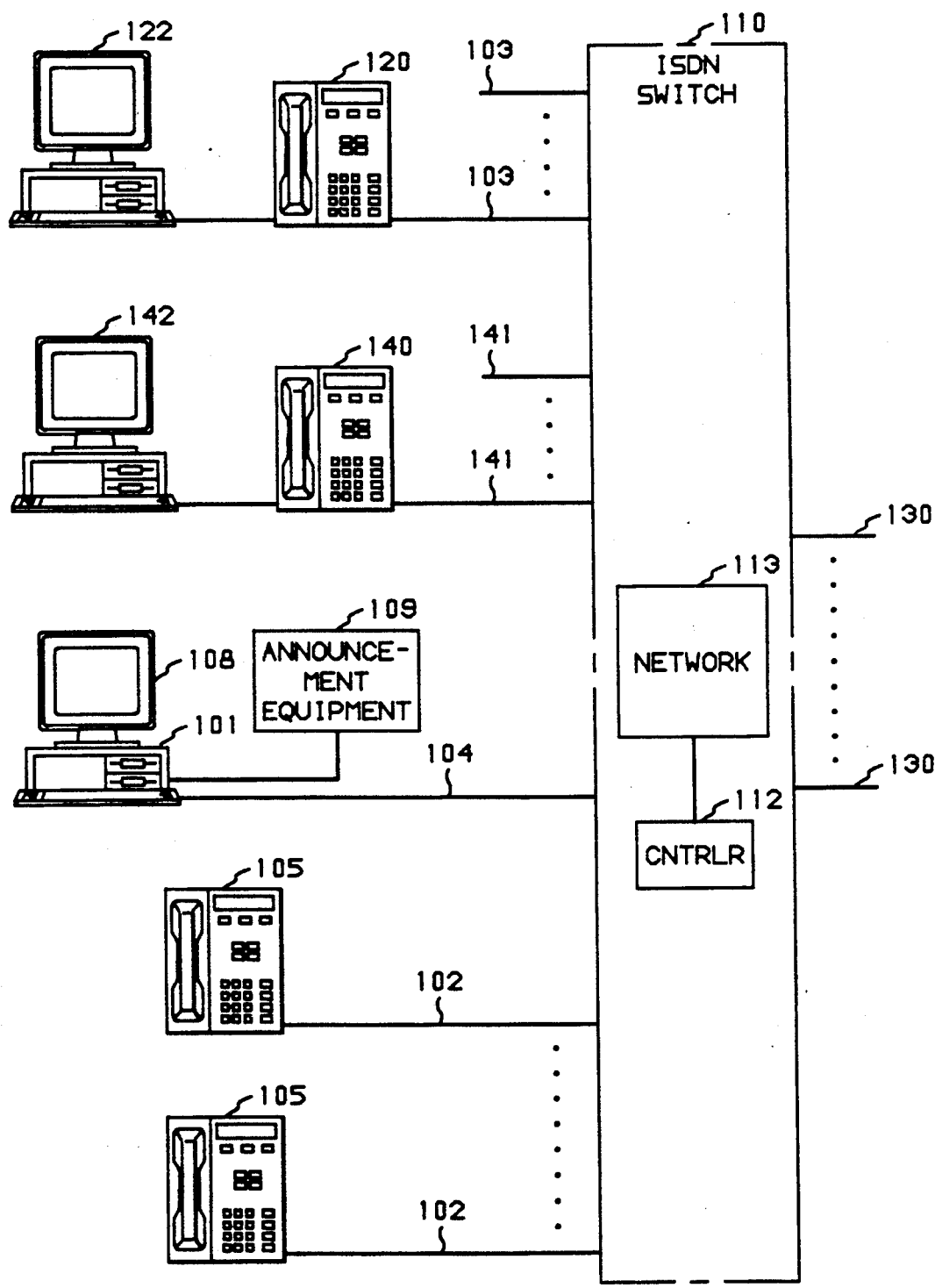
FIG. 1 is a representation of an ISDN switch together with a plurality of ISDN stations and a monitoring computer, connected to the switch via individual subscriber lines.

FIG. 1 is a representation of an illustrative telecommunication system including a representative principal ISDN telephone station 120 connected via a subscriber line 103 to the ISDN central office switch 110. Associated with the principal station is a display terminal 122 connected to the ISDN station set 120, via a well-known RS232 connection. This connection supports data communications with central office switch 110, through the station set 120 and over the ISDN line 103, in a well-known manner. A plurality of such stations may be connected to the switch 110 via other subscriber lines 103. A representative secretarial station 140 is connected to the switch via subscriber line 141 and an associated secretarial display terminal 142 is connected to the central office switch via an RS232 connection in the ISDN station set 140, and ISDN line 141. Other such stations may be connected to switch 110 via other subscriber lines 141. Stations 105, connected to the central office switch 110 via subscriber lines 102, represent other subscribers connected to the switch, and may include one or more telephone answering message centers. A computer 101 is connected to the switch 110 via a standard ISDN subscriber line. A display 108 and announcement equipment 109 are connected to the computer.

The computer 101, by means of a feature of ISDN switches, known as shared call appearance, shares call appearances with each of the principal stations served by the computer. It may also have a shared call appearance with a secretarial station such as represented by station 140 and any other station connected to the switch 110. When a call for a principal station such as station 120 is received by the central office switch 110 from an interoffice trunk 130, the call is extended to the station 120. This involves the interchange of ISDN messages between the station 120 and the switch. By virtue of the shared call appearance feature, so-called associated messages are transmitted by the switch, via the shared call appearance line 104, to the computer 101. The computer analyzes these messages and recognizes that this is a call for a particular associated station. Based on information stored in the computer, it will make a determination as to whether the incoming call is to be forwarded to another station. After such a determination is made, the computer initiates a call through the switch 110 to the station (e.g. secretarial station 140) to which the call is to be forwarded. The computer also sends a transfer message to the switch 110 identifying the incoming call and the computer initiated call to station 140. The switch will respond by interconnecting the two identified calls. The ISDN switch has a feature whereby the switch will forward calls to a designated number if the original destination station is busy. Such calls may be forwarded to computer 101 and the computer will perform call screening on such calls allowing the calling party an option to leave a message, hold or interrupt the principal.

If the computer 101 has a shared directory number with the secretarial station 140 or with any other station to which the call is being forwarded, the computer can make a determination as to whether the station is busy or idle before it transfers the call to that station. This allows the computer 101 to initiate steps to transfer the call to a second alternate in case the first alternate is busy. By virtue of the shared call appearance with the secretarial stations, the computer 101 receives messages corresponding to all significant call handling messages exchanged between the shared call appearance stations and the switch. The computer interprets these messages and creates station activity data which includes a record of calls and data on the busy/idle state of the stations. Details of the call monitoring and call handling are described in subsequent paragraphs. In the arrangement of this invention, the ISDN switch functions simply to route and interconnect calls. The functions of selecting stations to which calls are to be forwarded and initiating of the transfers to appropriate stations are under control of the computer 101, which is connected to the switch via a standard ISDN subscriber line.

Any of the stations served by the computer and any of the stations to which calls are forwarded, may be ISDN or analog stations. If a principal station 120 or a secretarial station 140 is an analog station, the associated displays will be connected to the switch 110 via modems in a well-known manner. For analog stations, the ISDN switch will transmit shared call appearance associated messages to the shared call appearance 104, while sending analog signals to the analog stations.

The ISDN switch 110 may be a well-known telecommunication switch adapted for use in the Integrated Services Digital Network. One such switch is disclosed in U.S. Pat. No. 4,592,048 of M. W. Beckner et. al., entitled "Integrated Packet Switching and Circuit Switching System". The system includes a controller 112 which controls the interchange of ISDN messages between the switch 110 and the agent stations 120 as well as the computer 101 and other stations 105. A network 113 functions under control of controller 112 to provide the necessary interconnections within the switch 110. The agent stations 120 and subscriber stations 105 may be any well-known ISDN stations adapted to interface via an ISDN digital subscriber line with an ISDN switching system or standard analog stations. The interface between an ISDN station and an ISDN switch is specified generally by the International Telegraph and Telephone Consultative Committee (CCITT) and more specifically defined in a document entitled "5ESS Switch ISDN Basic Rate Interface Specification" published by AT&T in 1985. This document specifies the messages that are transmitted from the switch to the ISDN station, also referred to as an ISDN terminal, as well as the messages that are expected to be transmitted from the terminal to the switch. The interface between the switch and the terminal is referred to as an ISDN basic rate 2B+D interface. The 2B+D designation refers to the two 64 kilobit channels for the transmission of encoded voice or data and the 16 kilobit D-channel used primarily for the transmission of control messages, contained in the ISDN subscriber line. In a typical scenario, the ISDN switch responds to an incoming call directed to a connected subscriber station by transmitting a SETUP message to the station. The station responds with an ALERTING message indicating that an alerting signal is being generated at the station. This will be followed by a CONNECT message when the station goes off hook. A DISCONNECT message may be transmitted from the switch to the terminal or vice versa depending upon whether the calling terminal or the called terminal initiates the disconnect.

The aforementioned Basic Rate Interface document includes key system features, defining interactions between key systems and the central office switch for two or more associated telephone terminals sharing call appearances. As described in the afore referenced interface documents, so-called associated messages are sent from the central office switch to each of the associated telephone terminals. As mentioned above, ISDN call handling messages such as call SETUP, ALERTING, CONNECT, DISCONNECT, etc. are transmitted between the switching system and the telephone terminal. Associated messages are messages transmitted to an associated terminal and correspond to certain of the messages transmitted between a principal terminal and the switch. For example, when a call is extended to one of the agent stations 120, the agent station and the computer 101 will both receive a call SETUP message. Only the agent terminal will respond to the message. Thereafter the switch communicates with the agent terminal and transmits associated messages to the computer, which interprets the associated messages and generates data defining agent station activity.

Figure 2:
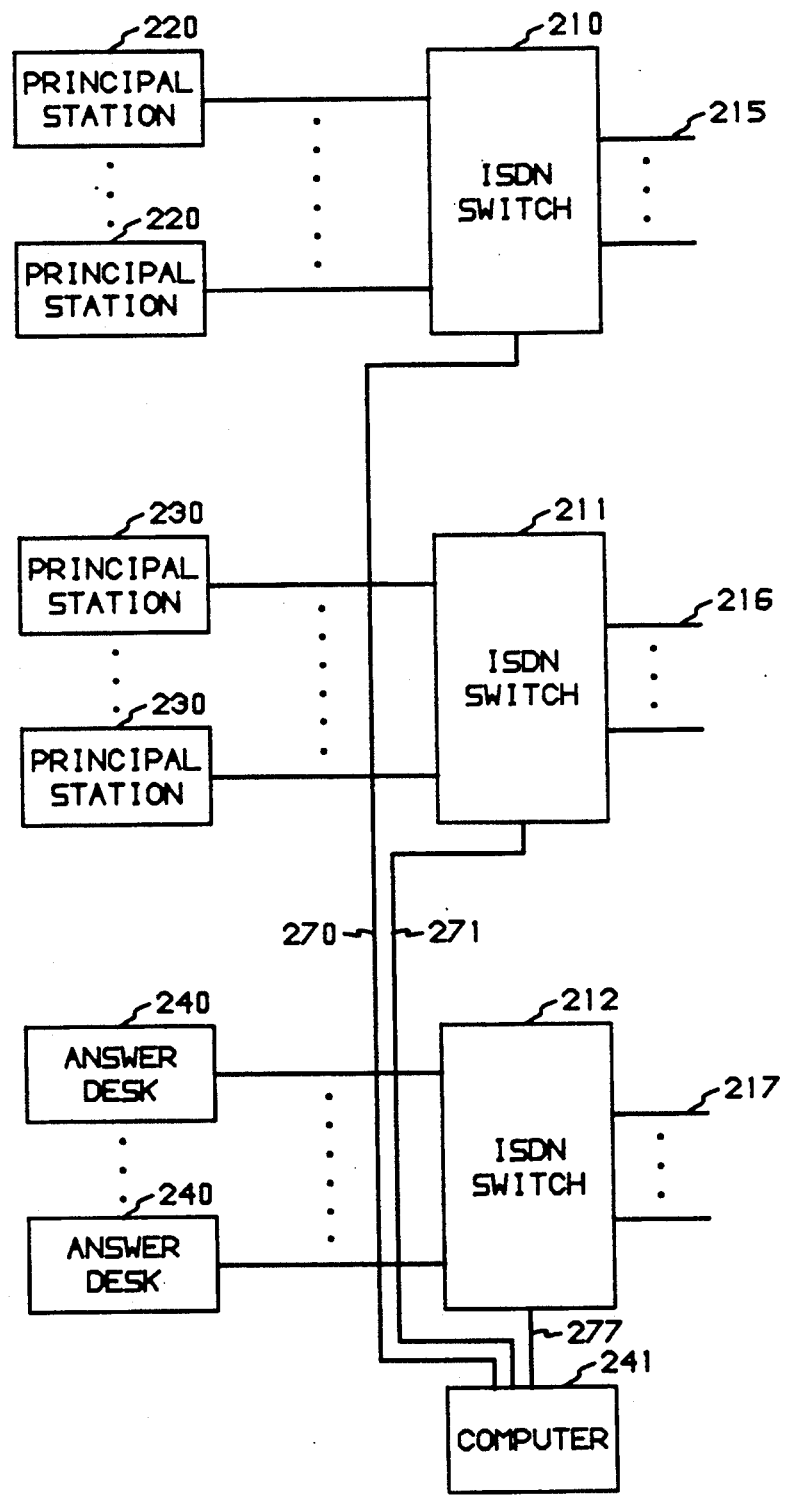
FIG. 2 is a representation of a plurality of ISDN switches together with a plurality of principal and telephone answering stations individually connected to the switches and a computer connected to all of the switches via ISDN lines.

FIG. 2 is a block diagram representation of a plurality of ISDN switches 210, 211 and 212 which have the same characteristics as switch 101 of FIG. 1. The figure shows the principal stations 220 connected to the ISDN switch 210 and principal stations 230 connected to the ISDN switch 211. In this example, answer desks are connected to the ISDN switch 212. Each of the switches will have other subscriber lines and interoffice trunks represented by 215, 216 and 217 for switches 210, 211 and 212, respectively. A computer 241 is connected to each of the switches. In this exemplary system the computer 241 is connected to ISDN switch 212 via a standard ISDN subscriber line and is connected to ISDN switches 210 and 211 by foreign exchange ISDN subscriber lines 270 and 271, respectively. The switches 210, 211 and 212 may be situated in geographically separated locations. Foreign exchange lines are subscriber lines from a distant central office, frequently located in another city. An ISDN foreign exchange line is a subscriber line from a distant ISDN office having the same characteristics and protocols as a standard ISDN line, described in the aforementioned basic rate interface document. By means of the subscriber lines between each of the switches 210, 211 and 212 and the computer 241, the computer can share call appearances with any of the stations connected to each of the switches. On the basis of associated ISDN messages received from each of the switches, the computer 241 generates activity data with respect to each of the stations on each of the switches with which the computer has a shared call appearance. When an incoming call is received, for example, in switch 210, to one of the principal stations 220, the computer 241 will recognize the identity of the destination station and determine whether and to what station, if any, the call is to be forwarded. The computer receives the information about the call in the form of associated messages via the ISDN foreign exchange line 270. In the event that the incoming call is to be forwarded to one of the answer desks 240, the computer 241 transmits the necessary messages over foreign exchange line 270 to establish a call via foreign exchange line 270 and one of the interoffice trunks 215 to ISDN switch 212 and to the selected answer desk. Thereafter, the computer sends a transfer message to ISDN switch 210 identifying the incoming call to the principal station and the call to the answer desk. This causes switch 210 to bridge the two calls and to clear the connections to the principal station 220 and to the computer 241. In a similar fashion, the computer 241 can control call forwarding from any station on any of the switches to which it is connected to any other station on any of these switches. If the computer is given shared call appearances with the answer desks or other stations to which a call is to be forwarded, the computer can test the busy/idle status of the call forwarding destination on any of the switches prior to transferring the call. The choice of connecting computer 241 via a regular subscriber line as opposed to a foreign exchange subscriber line, to the same switch to which the answer desks are connected, is an arbitrary choice. The actions of the computer are identical for foreign exchange ISDN lines and regular ISDN subscriber lines.

Figure 3:
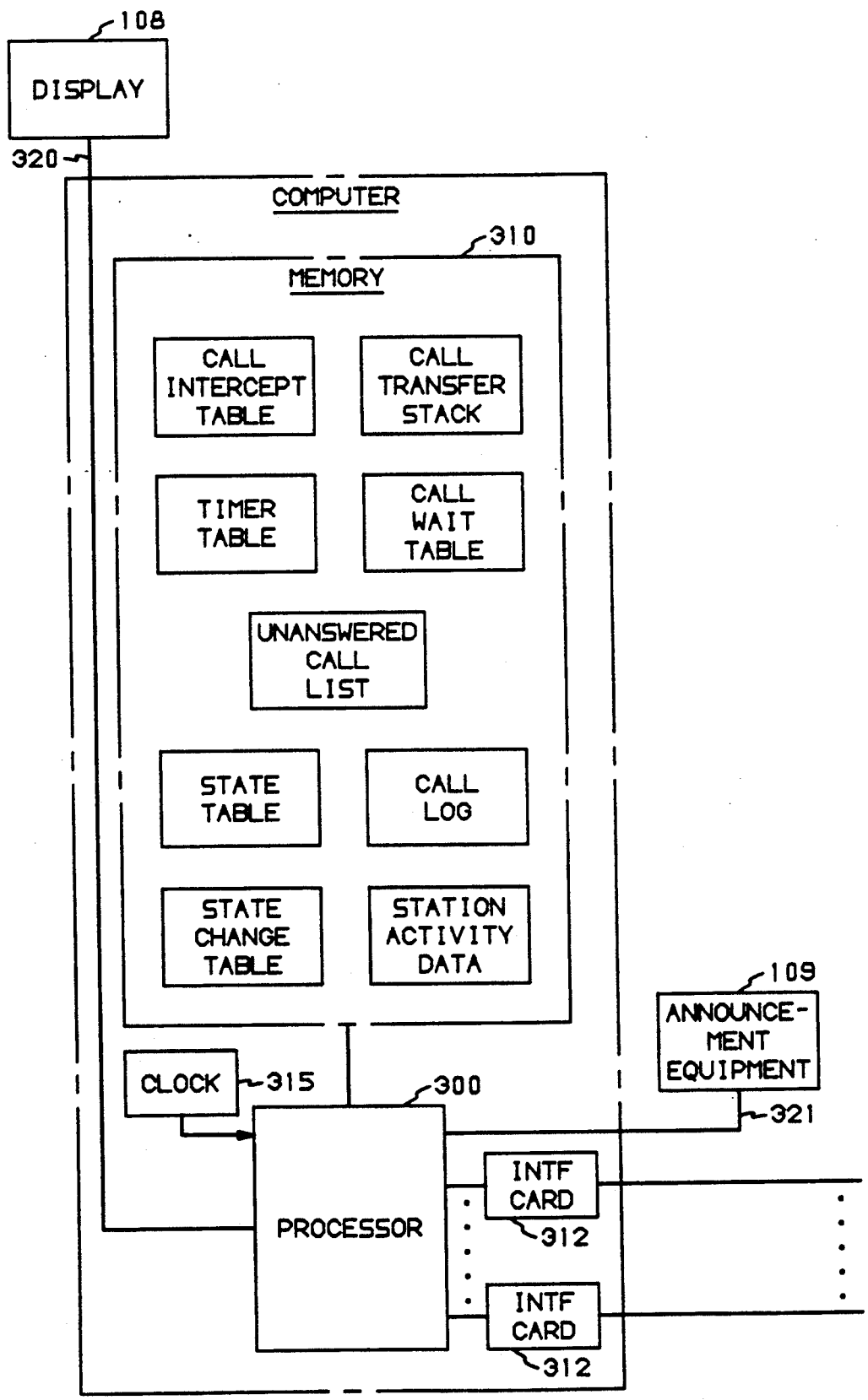
FIG. 3 is a block diagram representation of the computer of the arrangements of FIGS. 1 and 2.

The computer 101 or computer 241 may be a well-known personal computer such as the AT&T 6300 PLUS personal computer. FIG. 3 is a block diagram representation of the computers of FIGS. 1 and 2, comprising a program controller processor 300 for executing program sequences as depicted in FIGS. 4 through 12. The processor 300 is connected to the ISDN line 104 via commercially available interface cards 312. This may be the TELEOS ISDN PC card made by Teleos Communications Incorporated, which provides signal compatibility between the ISDN line and the computer. The computer further comprises a memory 310 for storing programs and data such as a State Table, a State Change Table, a Call Log and the Station Activity Data, as well as a Call Intercept Table, a Call Transfer Stack, a Timer Table, and an unanswered call list. A clock circuit 315 provides required clock signals to the processor 300 and a time-of-day signal used in generating time stamps for use in time recording. The processor 300 is connected to display 108 via cable 320 and to Announcement Equipment 109 via cable 321.

Figure 4:
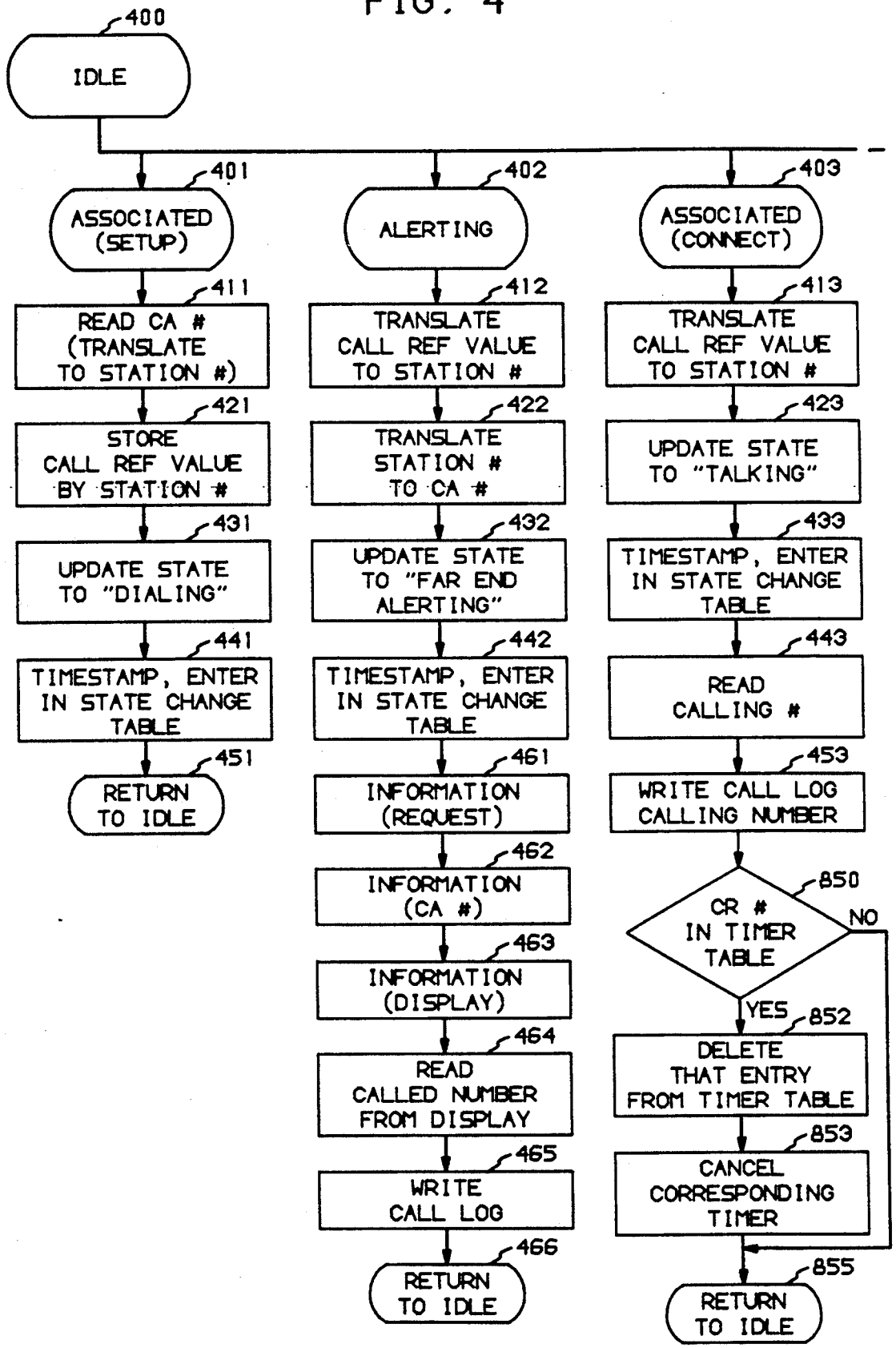
FIGS. 4 through 8 are flow chart representations of functions performed by the computer and deriving agent station operational data.
Figure 5:
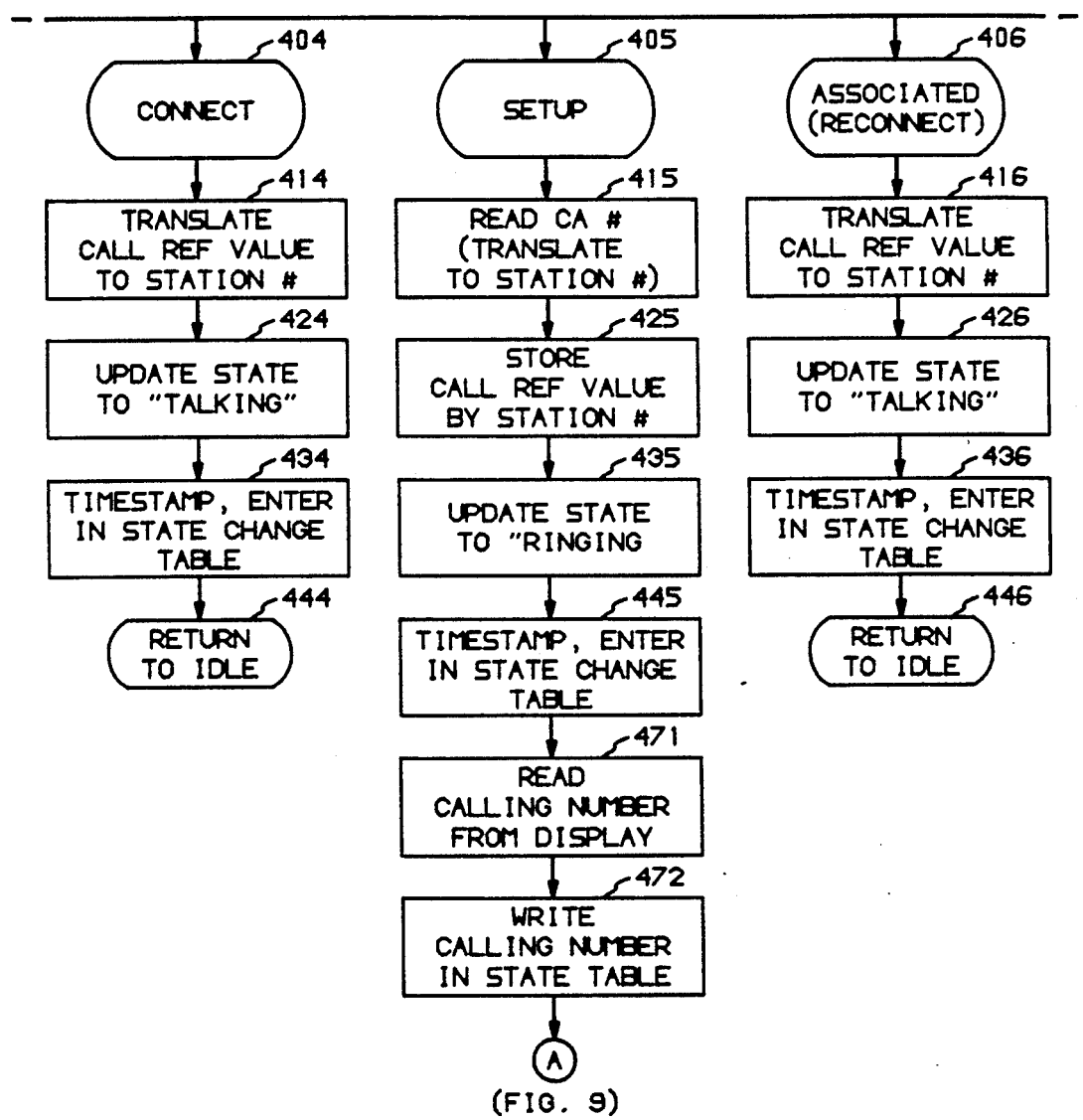
Figure 6:
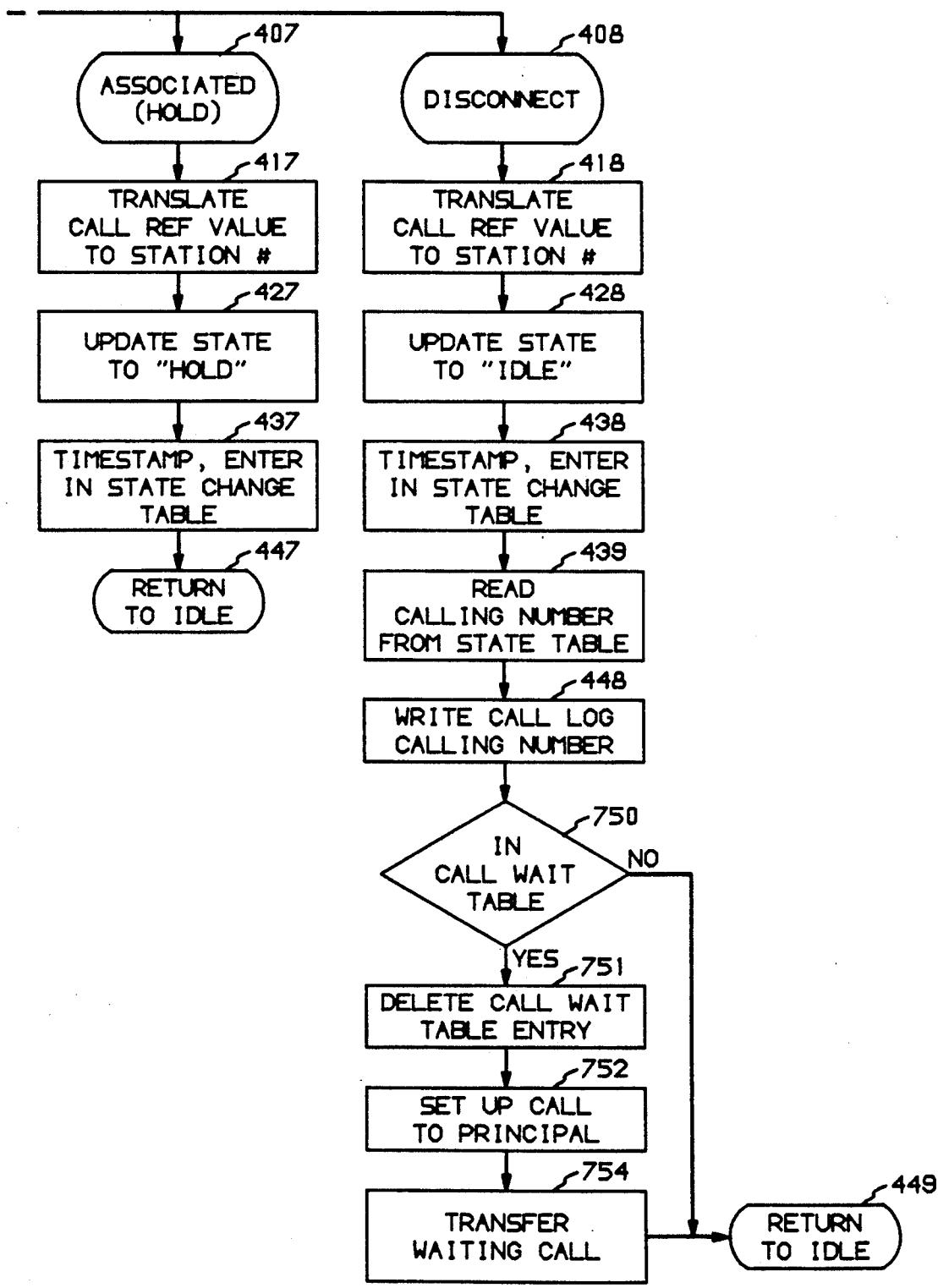
Figure 7:
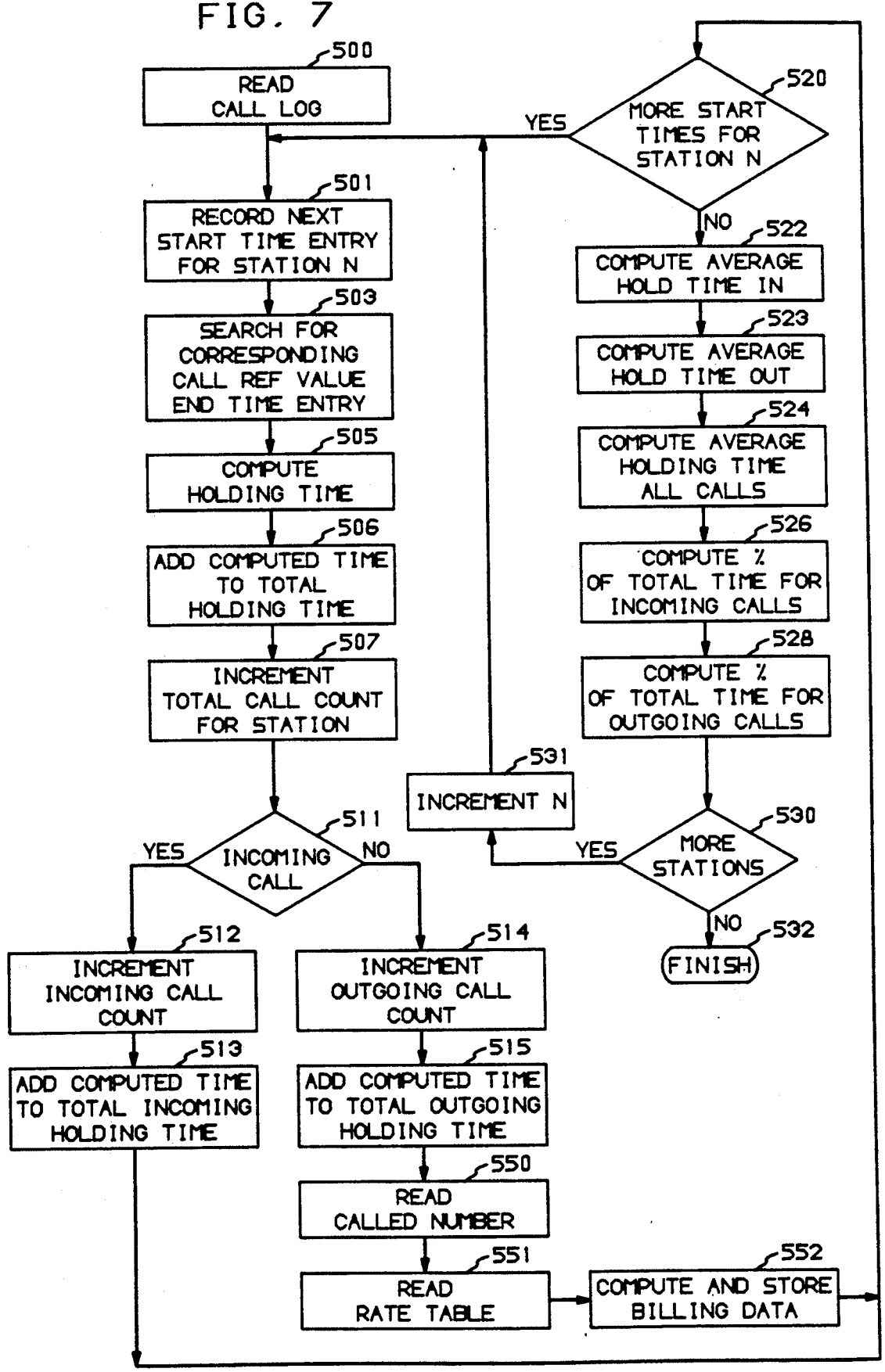
Figure 8:
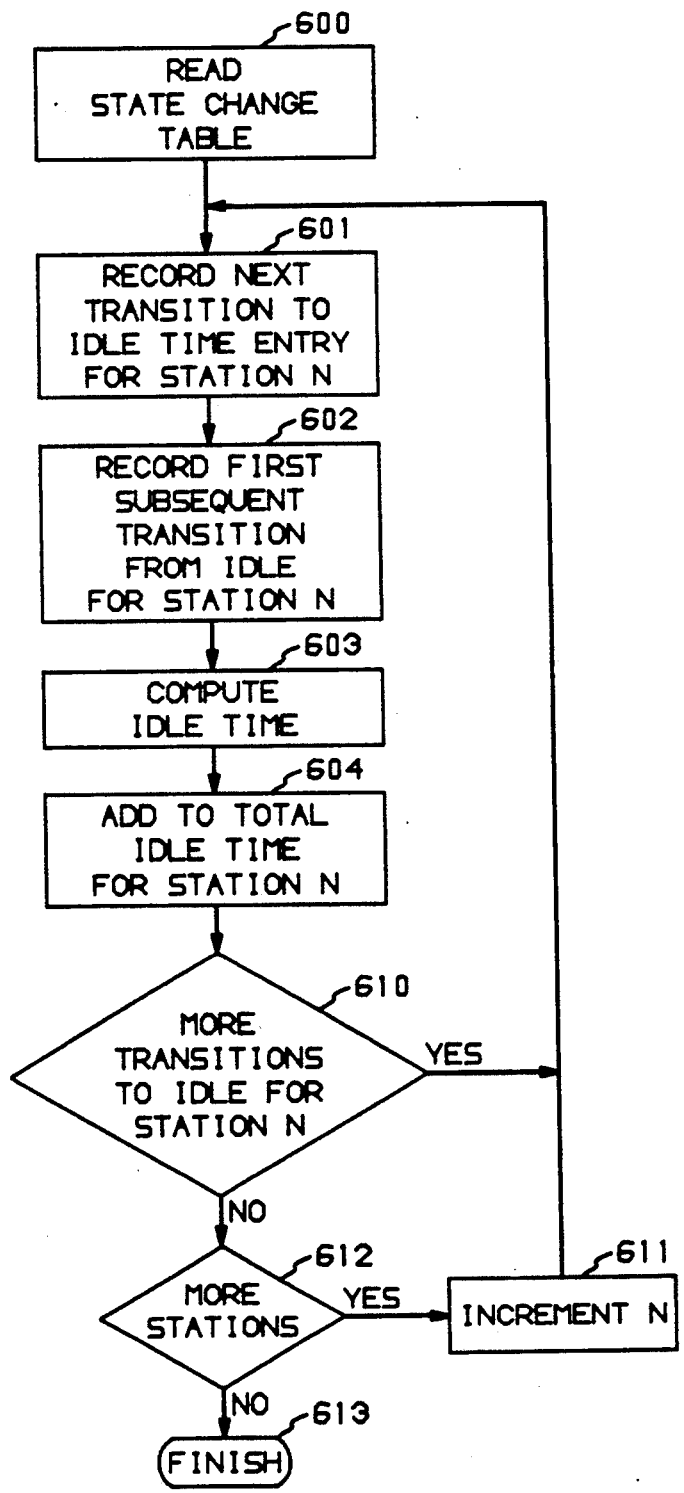
Figure 9:
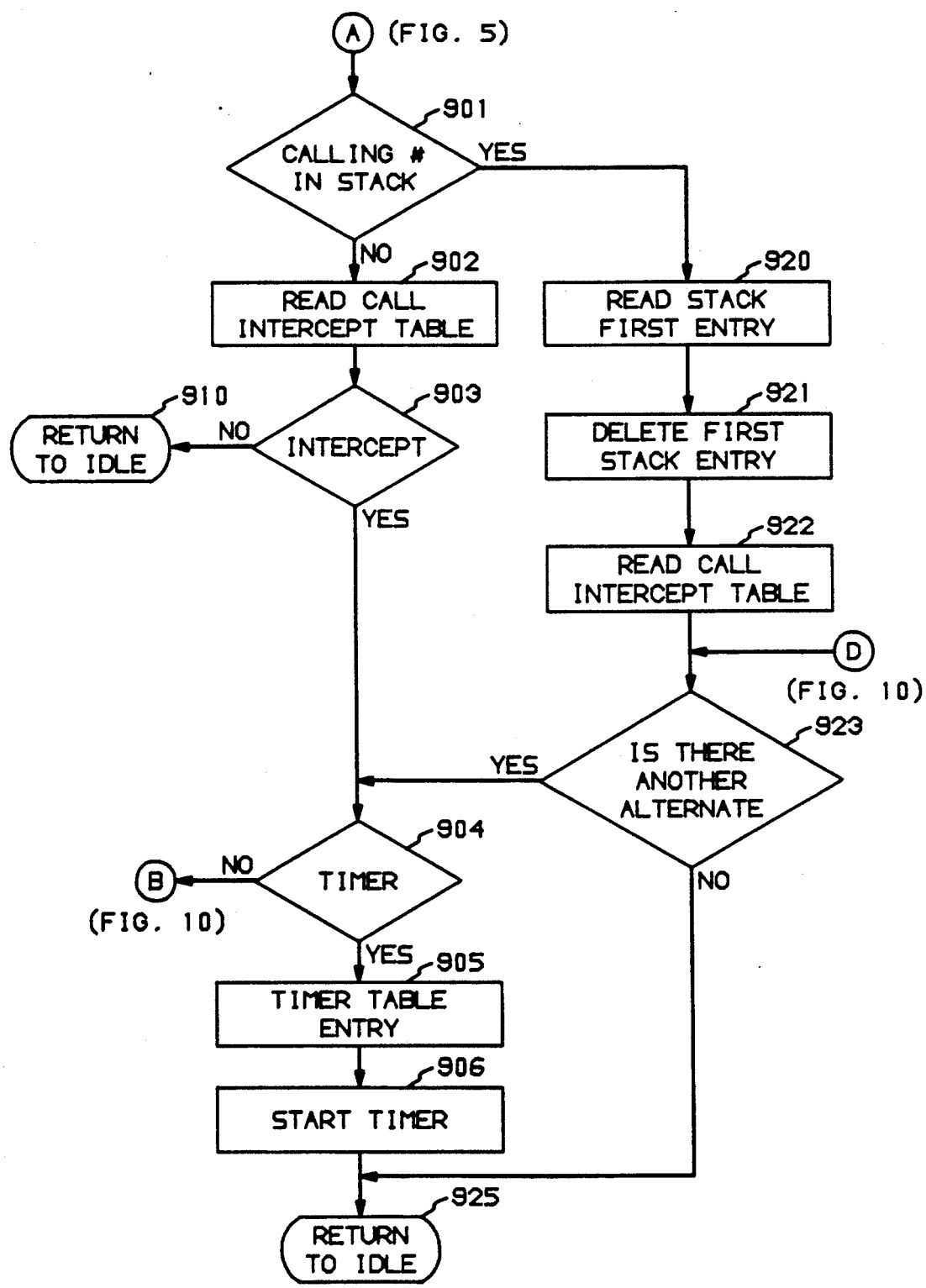
FIGS. 9 through 12 are flow chart representations of call handling functions performed by the computer.
Figure 10:
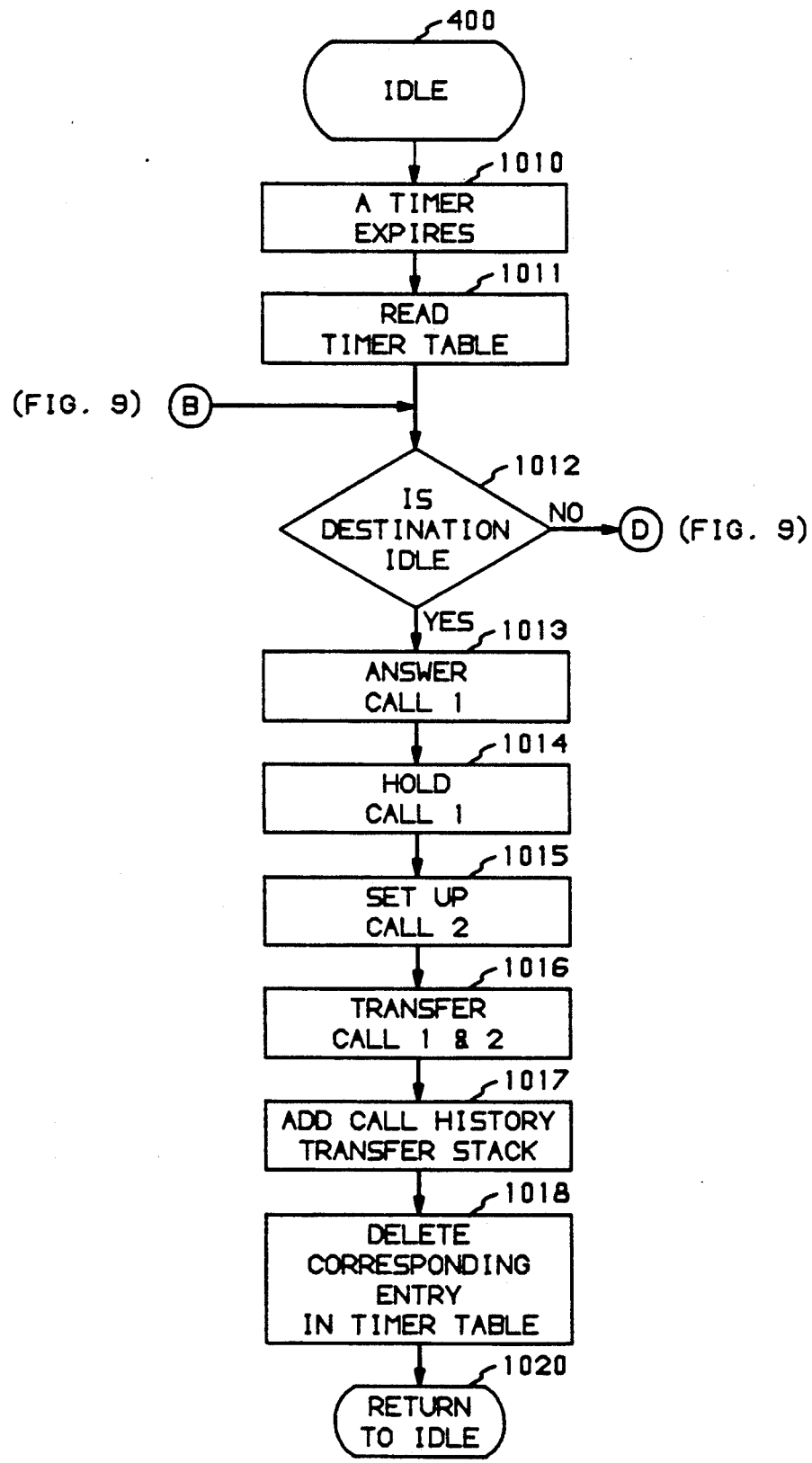
Figure 11:
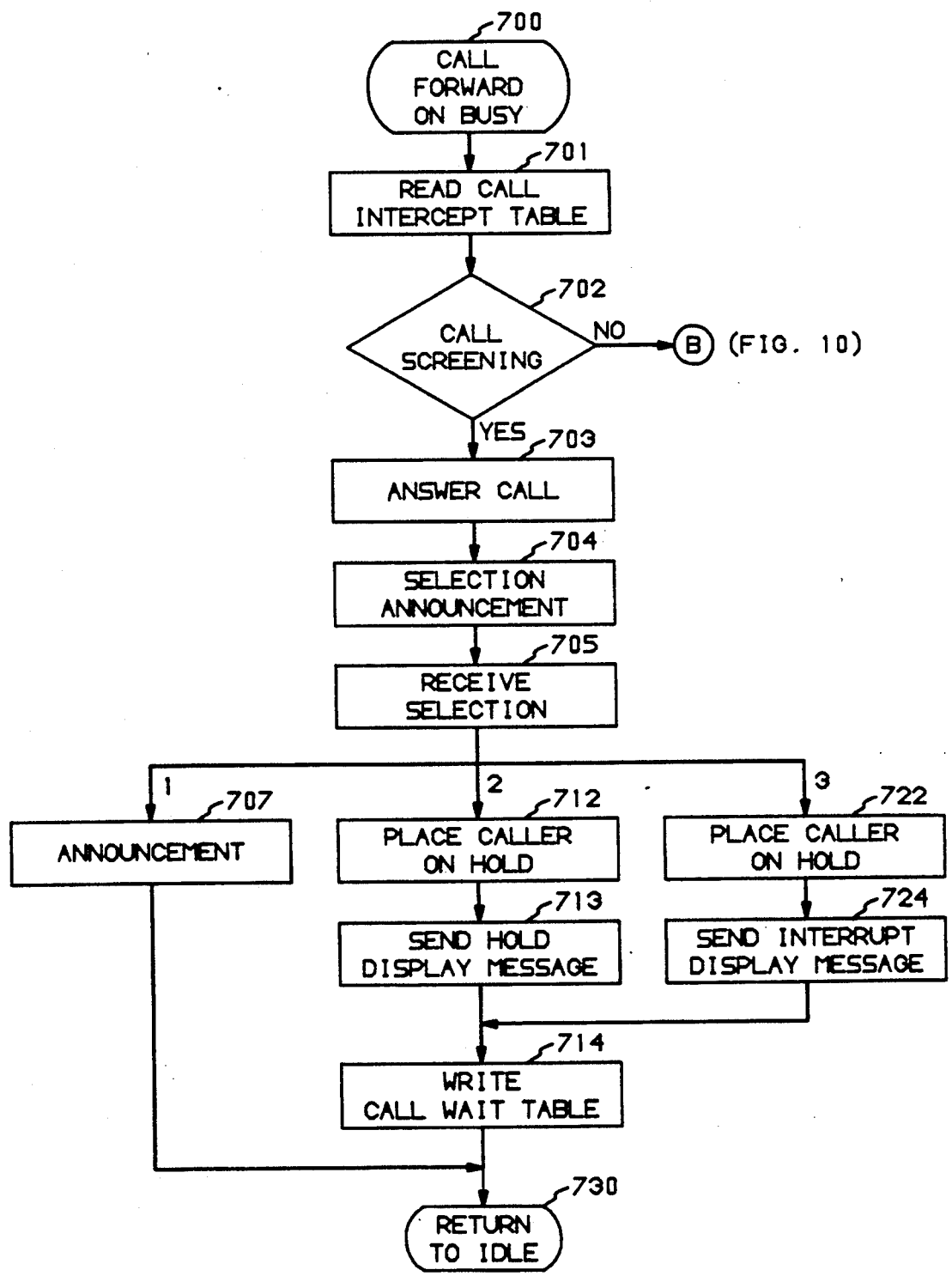

FIGS. 4 through 6 are flow chart representations of functions performed by the computer 101 in response to the various associated ISDN messages which the computer will receive via subscriber line 104 by virtue of the shared call appearance with several of the stations connected to switch 110. FIGS. 7 and 8 are flow chart representations of functions performed in computing station activity data. FIGS. 9 and 10 are flow chart representations of functions performed by the computer in handling calls for selected stations. The flow charts of FIGS. 4 through 10 are described in the following paragraphs with respect to computer 101 in FIG. 1. Analogous functions will be performed by computer 241 in the system of FIG. 2. In FIGS. 4 through 6, block 400 represents the idle state of the computer 101 and blocks 401 through 408 represent eight associated message types which will be transmitted to the computer from the switch. Table 1, in the first column, shows the messages exchanged over an ISDN subscriber line between the ISDN switch 110 and an ISDN subscriber station; the second column show the direction of the messages; the third column lists the corresponding messages received by the computer and the fourth column lists the functional significance of the various messages to the computer. The computer 101 will receive these messages for the various shared call appearances as they are transmitted by the switch and may store the messages in buffers as they are received. FIGS. 4 through 6 show the sequences executed by the computer in recording relevant information extracted from the messages. By way of example, block 401 represents the processing of the ASSOCIATED (SETUP) message by the computer 101. The computer enters a program routine which advances to block 411 where it reads the origination call appearance number which is included in the ASSOCIATED (SETUP) message. Table 2 lists by way of example, typical information elements contained in a message. Each of the ISDN messages referred to herein is defined in the aforementioned Basic Rate Interface document. The call appearance number obtained from the message is translated into a station number in block 401 by means of information in the State Table stored in memory 310. The State Table contains directory numbers and call appearance numbers for each of the agent stations 120. The directory or station numbers and call appearance number are permanently assigned. Hence, the table allows for the translation between directory or station numbers and call appearance numbers. Other data in the table is altered as messages are received from the switch, including states of calls for each of the agent stations, call reference values for each of the calls and calling number information. Table 3 is an exemplary state table layout showing arbitrary directory numbers for seven agent stations 120, and arbitrarily assigned call states, call appearance numbers (CA), call reference values (CR) and calling numbers. In block 421 of FIG. 4, the computer stores the call reference value obtained from the ASSOCIATED (SETUP) message in the State Table with the corresponding call appearance number and station number. In block 431 the computer updates the state of the call in the State Table entry associated with the call appearance identified in the received message. As shown in the fourth column of Table 1, the computer interprets the ASSOCIATED (SETUP) message as corresponding to an origination dialing action. Accordingly, the state in the State Table is updated to dialing in response to this message. In block 441 a time stamp derived from the computer's clock 315 is entered in State Change Table in the computer memory 310 together with an indication of state change, i.e., idle to dialing, and the station number. An exemplary State Change Table memory layout is shown in Table 4. The contents of this table is used by the computer 101 to compile statistics reflecting agent activity, as will be described later herein with reference to FIGS. 7 and 8. In each case, upon completion of the various steps in response to the receipt of a message, the computer 101 will return to the idle state as indicated in block 451.

It should be understood that FIGS. 4 through 6 are representations of the action of the computer 101 in response to each of the different types of messages that it receives. The format and content of each of the individual message is defined in the aforementioned Basic Rate Interface document. In FIGS. 4 through 6, sequences of steps to be performed by the computer 101 are shown in connection with each of the different messages which may be received. In each case, the message received will include a call reference value. The call appearance values are included only in the ASSOCIATED (SETUP) message and the SETUP message. For the other associated messages the call reference value is translated into a station number by means of the information in the State Table (Table 3) in memory 310. The call reference value is a value assigned to a call for its duration. It uniquely identifies the call and is incorporated in all messages relating to the identified call. As indicated above with reference to the ASSOCIATED (SETUP) message, the call reference value is stored in the State Table in memory 310 at the time that message is received. For subsequently received messages, the call reference value is translated to a station number based on the relationship between the station number and the call reference value defined in the State Table. This action is reflected in blocks 412, 413, 414, 416, 417, and 418. The receipt of each message by the computer causes the state of the call in the State Table (Table 3) to be updated to the state represented by the received message. Table 1 recites function statements which indicate the interpretation that the computer 101 attaches to each of the messages. The step of updating the state information in the State Table is shown for example in blocks 431, 432, 423, 424, 435, 426, 427 and 428. In response to receiving each of the messages, the computer also generates a time stamp and enters the time stamp, together with state change information and the station number, in the State Change Table of memory 310. An exemplary memory layout for the State Change Table is shown in Table 4. The action of updating the State Change Table is reflected in blocks 441, 442, 433, 434, 445, 436, 437 and 438.

The sequence followed by computer 101 is essentially the same for the CONNECT, ASSOCIATED (RECONNECT), and ASSOCIATED (HOLD) and the steps have been described, generally, above. The actions of the computer 101 in response to the ALERTING message, the ASSOCIATED (CONNECT) message, the SETUP message, and the DISCONNECT message involve additional steps beyond those explained above and will be described in further detail. Block 402 represents the receipt of the ALERTING message from the switch 110. As shown in Table 1, the computer interprets this message as indicating that the far end, i.e., the called party, is being alerted. Block 412 represents a translation of the call reference value to station number with the aid of information in the State Table in memory 310. Block 422 indicates a further translation from station number to call appearance number also obtained from the State Table. In block 432 the state of the call in the state table is updated to "far end alerting". In block 442 the time stamp representing current time is entered into the State Change Table in memory 310 (Table 4) together with the station number and an indication of a state change from "dialing" to "alerting". For record keeping purposes it is desirable to record the called station directory number. The ASSOCIATED (SETUP) message, which precedes alerting, may include in its display field the outgoing call directory number. However, this field is optional and the directory number may be omitted from the ASSOCIATED (SETUP) message. In any event, the called line identification will be displayed on the agent terminal, as a normal ISDN feature, and is obtainable by an information message from the computer 101 to the switch 110. Block 461 represents the sending of such a message. Block 462 represents a follow-up message including the call appearance number which defines for the switch the identity of the desired display. Block 463 represents an information message from the switch 110 to the processor 101 providing the display information. Block 464 represents the action by the computer of reading the called number from the display information and block 465 represents entering this number in the Call Log in memory 310. An exemplary memory layout of the Call Log is shown in Table 5. The information entered in the Call Log includes a date and time stamp of current time, the station number derived in block 412, the called number obtained in block 464, the call reference value and an indication that this is the start of an outgoing call.

As outlined in Table 1, for a normally progressing call, the ALERTING message is followed by the CONNECT message and a DISCONNECT message. The processing of the CONNECT message by the computer is indicated in block 404 and the actions taken in response to the receipt of that message are indicated in blocks 414, 424, 434 and 444, as explained earlier. The receipt of the DISCONNECT message is shown in block 408. In addition to the actions taken in blocks 418, 428 and 438, which have been discussed earlier herein, the computer, in block 439, obtains the calling number, if any, from the State Table and makes an entry in the Call Log (Table 5) in memory 310, in block 448. The Call Log entry will include a date and time stamp, the station number, the far party number, the call reference value and an indication that this is the end of the call.

In the event of a termination of a call to one of the shared call appearance stations, a SETUP message is transmitted from the switch to one of the stations and the same message is received by the computer 101, as illustrated in Table 1. In FIG. 5, block 405 represents analysis of the SETUP message by the computer. The SETUP message will include a call appearance number and a call reference number and key pad data which represents the called directory number. In block 405 the call appearance number is translated to a station number by means of the State Table represented by Table 2. In block 425 the call reference value defined by the message is entered in the State Table in memory 310. In block 435 the state of the call is updated to "ringing" in the State Table. An entry is made in the State Change Table in memory 103 (Table 4) including a time stamp indicating current time, the station number and an indication that the state has changed from "idle" to "ringing" in block 445. The SETUP message incorporates a display field defining the calling number. In block 471 this calling number is obtained from the display field and in block 472 it is entered into the State Table in memory 310. Other functions to be performed in analysis of the SETUP message are explained later herein with respect to FIG. 9.

The computer 101 expects to receive an ASSOCIATED (CONNECT) message after receipt of the SETUP message for an associated station, as indicated in Table 1. The receipt of this message is shown in block 403. In blocks 413, 423 and 433 the computer performs the functions of translating the call reference value to a station number based on information in the State Table, updates the State Table and updates the State Change Table. In block 443 the calling number is read from the State Table in memory 310 on the basis of the call reference value. In block 453 an entry is made in the Call Log in memory 310 including a time stamp, the station number, and "incoming" and "start" indication, the calling number and the call reference value. When a DISCONNECT message is received subsequent to the ASSOCIATED (CONNECT) message, a Call Log entry will be made showing the ending time of the call. Other functions to be performed in analyzing the ASSOCIATED (CONNECT) are explained later herein with respect to FIG. 11. The stations typically will have a Hold feature and when this is activated the computer receives an ASSOCIATED (HOLD) and a subsequent ASSOCIATED (RECONNECT). The receipt of these messages is represented by blocks 406 and 407 and the effect of these messages is to update the State Table (Table 3) and the State Change Table (Table 4) in memory 310 as described above.

Table 6 is a representation of station activity data which may be used to evaluate agent station activity. The data includes the number of incoming and outgoing calls and the total number of calls handled by each of the agent stations. In addition, the average holding (i.e. activated) time for incoming calls, outgoing calls and all calls as well as the percentage of time spent on incoming and outgoing calls and time spent in the idle state, are recorded in this table as described later herein with respect to FIGS. 7 and 8. Computer 101 generates these statistics on the basis of data in the State Change Table (Table 4) and Call Log (Table 5) in the memory 310.

FIGS. 7 and 8 are flow chart representations of the software of the computer 101 used to derive the information of Table 6 from the State Change Table and the Call Log. Referring to FIG. 7, the Call Log is read in block 500 and in block 501 a "start time" entry for a selected station number is recorded. In block 503 the Call Log is searched for a corresponding call reference value having the "end time" entry. In block 505 the holding time is computed as the difference between the start time and the end time. In block 506 the computed holding time is added to the total holding time for the station. In block 507 the total call count for the station is incremented by 1. Block 511 is a decision block to determine whether the call for which the computations are made is an incoming call. If so, the transfers made to block 512 where the incoming call count is incremented and the holding time computed in block 505 is added to the total incoming holding time for the selected station, in block 513. In the event that it is an outgoing call, a transfer will be made from decision block 511 to block 514 where the outgoing call count is incremented. In block 515 the computed time will then be added to the total outgoing holding time for the station. For both incoming and outgoing calls, the next action is to determine whether there are more start times for the station under consideration, as represented by decision block 520. If so, a transfer is made to block 501 and the steps between blocks 501 and 520 are repeated for the next call for station N. After all calls for a station have been recorded and holding times properly computed, the decision in block 520 will reflect the fact that there are no more start times for station N and a transfer will be made to block 522 to compute data for station N. Average holding times for incoming calls, outgoing calls and all calls for station N are computed in blocks 522 to 524. This is based on the recorded incoming, outgoing and total counts and the corresponding holding times. In blocks 526 and 528 the percentage of time spent for incoming and outgoing calls is computed based on the ratios of the total incoming and outgoing holding times with respect to the total holding time. Thereafter, in block 530 a decision is made to determine if there are other stations for which the computations need to be made. If so, the value of N is incremented in block 531 to identify the next station and the process, beginning at block 501 is repeated. When the statistics for all stations have been compiled, the program terminates as indicated in block 532.

In addition to generating station activity data, the computer is adapted to generate detailed billing records for outgoing calls made from the agent stations. In blocks 514 and 515 of FIG. 7 actions are taken with respect to outgoing calls as described above. Subsequent to these actions, in block 550, the called number is read from the Call Log (Table 5) in its Far Party column. Thereafter, in block 551 the computer reads a rate table stored in memory 310. The rate table is a data table customarily provided by a telephone company or long distance carrier which defines the charges for telephone calls to other areas by area code and the office code, both of which are part of the telephone number recorded in the Call Log. In the exemplary Call Log of Table 5, the area code is omitted from some of the numbers indicating that those numbers have the same area code as the central office switch to which the computer is connected. The charges customarily depend on the time of day the call was made as well as the length of time of the call. The length of time of the call was computed in block 505 of FIG. 7. The time of day, the fact that it is an outgoing call and the number of the called party are recorded in the Call Log. On the basis of this data the computer 101 computes billing data in a well-known fashion and stores such data in the memory 310 prior to advancing to decision block 520 for further action. This type of computing and storing billing data is indicated in block 552.

In this illustrative system, outgoing call data in Table 6 is intended to cover all outgoing calls, including unanswered calls. Starting times for outgoing calls are recorded in the Call Log in response to the ALERTING messages as shown in FIG. 4. However, that is before the call is answered. Hence, the billing computation shown in FIG. 7 includes ringing time and unanswered calls. If a more accurate billing computation is desired, the State Change Table may be consulted to identify unanswered calls (i.e. calls that did not make a change to the Talk State), and actual connect time, (i.e. from transition to the Talk State to disconnect).

FIG. 8 is a flow chart representation of a program for computing the time spent by each station in the idle state. A time limit may be imposed on the program to recognize only idle time periods occurring during working hours in order to exclude off periods such as lunch time, etc. As shown in FIG. 8, block 600, this program reads the State Change Table of the memory 310, (Table 4). In block 601 the computer records the entry time of the transition to the idle state for a station N and in 602 obtains the first subsequent transition in time from idle to another state. In block 603 the idle time is computed as the difference between those state changes and in block 604 the total idle time for the station is computed. Block 610 is a decision block to determine if there are more transitions to idle for this station if so, a transfer is made back to block 601 to repeat the steps of block 601 through 604. When all the transitions for a particular station have been recorded, a transfer is made to decision block 612 to determine if there are other stations to be considered. If so, the station number is incremented in block 611 and a return is made to block 612, for the next station. The number N is an arbitrary designation for a station number and the step of incrementing N in block 611 represents an action by the computer to find the next station for which idle time is to be computed. When statistics have been compiled for all the stations, the program finishes as indicated in block 613. The data computed by means of the programs outlined in FIGS. 7 and 8 may be stored in memory 310 as station activity data in the form of Table 6. This information may be displayed to a manager by means of the display 108 which is connected to the computer 101 via interconnecting cabling 320.

The computer 101 or 241, in addition to monitoring messages from shared call appearance stations and periodically updating the station activity data, will also perform automatic call handling. The various associated messages received from shared call appearance stations while carrying out the call handling functions, may be buffered by the computer for later analysis which may be executed periodically. Alternatively, a multitasking computer will be able to perform these various functions concomitantly. The computer answers incoming calls directed to one or more directory numbers assigned to the computer, and places outgoing calls by exchanging standard ISDN messages over the ISDN subscriber line, in the same manner as an ISDN station set. Each of the ISDN messages received by the computer includes a call reference value which uniquely ties the message to a call. Hence the computer, by reference to the State Table and information about its own calls, can readily sort out messages relating to associated stations from messages relating to calls handled by the computer. The flow charts do not specifically show the sequences executed by the computer in handling ISDN messages for calls initiated by or terminated to the computer. However, such functions are essentially the same as those performed by a standard ISDN terminal and are well-known in the art.

FIGS. 9 through 12 are flow chart representations of actions performed by the computer 101 in providing call coverage for a shared call appearance station, for example a principal station such as station 120. Analogous functions are performed by computer 241 with respect to stations connected to switches 210, 211 and 212. When an incoming call is made to a station with which the computer shares the call appearance, e.g. station 120, the computer receives a SETUP message as depicted in block 405 of FIG. 5. In addition to performing a message analysis to gather data with respect to the activity of this station, a number of functions are performed to determine the call coverage action to be taken. Certain of the actions in connection with call coverage are outlined in flow chart form in FIG. 9. In block 901, a test is made to determine whether the calling number read from the display in block 471 of FIG. 5 is in the Call Transfer Stack. The Call Transfer Stack is a table in memory containing the identity of calls previously transferred by the computer. The function of the Call Transfer Stack, an example of which is shown in Table 7, will be discussed in subsequent paragraphs. In the event that the calling number is not in the Call Transfer Stack, the computer will read the Call Intercept Table which is a table stored in memory 310 recording the numbers to which intercepted calls are to be transferred for each called station and the conditions under which the transfer is to be made. An example of the Call Intercept Table is shown in FIG. 8. The step of reading this table is outlined in block 902. In decision block 903, after reading the Call Intercept Table, a test is made to determine whether the call to the covered station is to be intercepted. If not, the computer will return to the idle condition as shown in block 910. If an intercept is to be performed, the Call Intercept Table (Table 8) is consulted to determine the delay before transfer, if any, for the call. This step is performed in block 904. If there is a delay, a Timer Table entry is made in block 905. The Timer Table is a table in memory 310, an example of which is shown in Table 9. The identification number of the timer selected for this particular call is entered in the Timer Table. The call is identified by the call reference number which is also entered in the table, together with the station number, the calling number and the call type, all of which are available from information in the SETUP message. In addition, the "Transfer To" station number obtained from the Call Intercept Table (Table 8) is entered in the Timer Table. Employing the clock circuitry 315 of the computer, as shown in FIG. 3, a timer corresponding to the number entered in the Timer Table is started, and set for a time period defined in the Timer column of the Call Intercept Table (Table 8). The action of starting the timer is reflected in block 906. Thereafter, a return is made to the idle state in block 905. If the Call Intercept Table shows that there is to be no delay before transfer, i.e. no entry in the Timer column, a transfer is made from decision block 904 to block 1012 of FIG. 10. The Call Intercept Table allows different criteria for forwarding different types of calls, e.g. internal calls and external calls. This is, calls from stations in a customer terminal group or from stations external to the group. This table may also indicate forwarding for specified calling numbers only. These criteria are used by the computer in determining whether a call is to be intercepted for forwarding and to what station.

Referring now to FIG. 10, the computer is shown in its idle state in block 400, which is the same state reflected in block 400 in FIG. 4. An exit from the idle state occurs when a timer expires, as indicated in block 1010. Block 1011 reflects a reading of the entry of the Timer Table (Table 9) corresponding to the number of the timer which has expired. From the Timer Table the computer will obtain the call reference number and the identity of the station to which the transfer is to be made. For example, for the first entry in Table 9 the call reference value is 4, and the station to which the transfer is to be made is 555-6015. In block 1012, a test is made to determine whether or not the transfer destination station, identified in the Timer Table in block 1011 or obtained from the Call Intercept Table in block 902, is idle. This information is readily available from the State Table (Table 3) in memory 310. If the destination station is idle, the computer 110 answers the call to be transferred by sending a CONNECT message to the ISDN switch 101. Since the computer has a shared call appearance with the station to which the incoming call was directed, the call may be answered from the computer using the call reference value obtained from the Timer Table or from the SETUP message if no delay was involved. The answering of the incoming call, referred to as call 1 in the flow charts of FIG. 10, is reflected in block 1013. In block 1014 the computer, by sending a HOLD message to the switch, places the incoming call on hold. Thereafter, as reflected in block 1015 the computer initiates a call to the station to which the incoming call is to be transferred. This is referred to in the flow chart of FIG. 10 as call 2. Subsequently, in block 1016 the computer sends a TRANSFER message to the switch identifying call 1 and call 2. The switch responds in the standard fashion of an ISDN switch by interconnecting the two calls and clearing the connections to the computer. Following this action, the call history is entered in the Call Transfer Stack (Table 7) as indicated in block 1017. This information includes the identity of the original calling station, the original called station and the station to which the call was transferred. The Call Transfer Stack entry also includes the identity of the station from which the call was transferred. In this case, that is a directory number assigned to the computer since the computer answered the incoming call and then caused it to be transferred to another number. This information is important for individual call coverage when the principal of the first station wishes to have the call forwarded to a second or other alternate destination in case the first alternate does not answer the call. For example, the first alternate may be an associate of the principal or a secretarial answer desk and the second alternate may be a call answering machine. The Call Intercept Table (Table 8) may define a first and one or more alternate destinations. The contents of the Transfer Stack (Table 7) is used to determine whether this is a first or an alternate destination transfer as discussed later herein. After adding the call history to the transfer stack in block 1017 the corresponding entry in the Timer Table (Table 9) is deleted in block 1018. Thereafter, a return is made to the idle state of the computer, as indicated in block 1020.

When the transfer call is set up by the computer to an alternate destination, as discussed in the previous paragraph, and the computer has a shared directory number with the alternate destination, the computer will receive associated messages which will include the SETUP message of the call initiated and transferred by the computer. After execution of sequences outlined in FIG. 5 with respect to the SETUP message, the contents of the message will be examined in decision block 901 to determine if the calling number is in the Call Transfer Stack (Table 7), as discussed earlier. This calling number will be the number of the computer in the "Transferred From" column of the Transfer Stack. In this illustrative system, all calls transferred by the computer are assigned a single directory number (e.g. 555-6020) and the transfer stack aids in recognizing a call transferred by the computer. The computer 101 sets up the calls in sequence, the switch 110 sends its messages back to the computer in sequence and the computer handles the received messages in sequence. Therefore, while it may be possible that more than one transfer is set up by the computer, the sequence in which they are handled is well defined. In block 920 of FIG. 9, the computer reads the first entry of the Call Transfer Stack. The first entry of the stack is deleted in block 921 and an advance is made to block 922 to read the Call Intercept Table. A test is made in decision block 923 to determine if there is a second or other alternate destination for the original called number. The original called station identity of the Call Transfer Stack corresponds to the called station number in the Call Intercept Table. This information, together with the call type, identifies the relevant entry of the Call Intercept Table. The "Transfer To" of the Call Intercept Table column may indicate a first number which is the first alternate destination and a second number which is the second alternate destination, by listing alternate numbers sequentially. Corresponding delay periods may be defined in the Timer column. By way of example, Table 8 shows that external calls to 555-6012 should first be transferred to a first alternate, 555-6015, after a 20 second delay. If that station does not answer in 10 seconds, the call is to be transferred to a second alternate, 555-6016. The computer knows the identity of the station to which the SETUP message pertains and can determine whether a first alternate or second alternate has been tried from that message or from information obtained from the Call Transfer Stack. In the event that all the alternates have been tried, the computer will return to idle as indicated in block 925. Otherwise, an advance will be made to block 904 to determine if there is a listed timer value corresponding to the next alternate destination. Thereafter, the sequence is as described above.

In decision block 1012 of FIG. 10 a test is made to determine whether the selected destination is idle. As mentioned earlier, this information is available to the computer in the state table in memory 310 (Table 3). If the selected destination is not idle, a return is made to a block 923 of FIG. 9 to determine if an alternate or another alternate is available. Thereafter, the sequence is as described above.

When an ASSOCIATED (CONNECT) message is received, it is analyzed for monitoring purposes, as shown in FIG. 4. Additionally, a test is made in decision block 850 of FIG. 4 to test whether the call reference value of a call is included in the Timer Table. If so, this indicates that an incoming call to an associated station requesting call forwarding after a specified period of time, has been answered. Hence the call will not have to be forwarded and the entry previously made for this call in the Timer Table is deleted, as indicated in block 852. The corresponding timer is canceled as indicated in block 853. Thereafter, the computer returns to the idle state via block 855. If it is found in decision block 850 that the call reference number is not in the Timer Table, an advance is made directly to block 855 to return to idle.

It is a feature of ISDN switching systems that they may be programmed to forward incoming calls to an alternate number if the original destination is busy. In this embodiment the switch 101 forwards such calls to a directory number assigned to the computer. The SETUP message from the switch extending the call to the computer will include, in the message type field, an indication that the call has been forwarded on busy. Block 700 of FIG. 11 indicates receipt of such a call by computer 101. In block 701, the Call Intercept Table is read. In block 702 a test is made to determine whether the call is to be forwarded or intercepted for call screening. If no call screening is indicated, the call will be forwarded to the number recorded in the Transfer To column of the Call Intercept Table. To accomplish the transfer, an advance will be made from decision block 702 to the call forwarding routine of FIG. 10, described earlier herein. If call screening is desired, an advance is made to block 703 of FIG. 11 where the incoming call is answered by transmitting a CONNECT message to the central office switch 110. Thereafter, the computer 101 establishes a connection to the announcement equipment 109 attached to computer 101. The announcement machine will provide a message to the caller asking the caller to dial a first, second, or third digit depending upon whether the caller wishes to leave a voice message, be placed on hold, or wishes to interrupt the principal. This announcement is provided in block 704. In block 705 the computer receives the digits and thereafter takes actions depending on the digits dialed by the caller. If a first digit is dialed, the computer connects the caller to announcement equipment 109 for a "Leave Message" announcement, as shown in block 707, allowing the caller to leave a message. Thereafter, the program returns to the idle state as shown in block 730. Alternatively, the caller may be connected to a secretary instead of an announcement. In the event that the calling party dials a second digit, the computer will place the call on hold by transmitting a HOLD message to the ISDN switch identifying the incoming call, as reflected in a block 712. In block 713, the computer 101 transmits a hold display message to the principal station display terminal (e.g. 122) via switch 110. In 714 the computer records the identity of the called station and the call reference number of the held call in the Call Wait Table (Table 10) in memory 310. Thereafter, a return is made to the idle state in block 730.

In the event that the calling party dials the third digit indicating that the caller wishes to interrupt the principal, the computer will place the incoming call on hold as indicated in block 722. This is accomplished by transmitting the HOLD message to the switch identifying the incoming call. In block 724 the computer alerts the principal that a caller wishes to alert the principal by means of an interrupt display message to the principal display, for example, display 122 for the principal of the station set 120. Alternatively, the principal may be alerted by means of priority ringing.

Thereafter, an advance is made to block 714 where the identity of the principal station and the call reference value of the incoming call are recorded. The computer then returns to the idle state via block 730. In providing display messages to the principal, the computer can provide the directory number of the calling party since that is included in the SETUP message received by the computer for the incoming call. The computer may also have access to a data base with the name or other identification associated with the calling number, and can then display such information as well. The transfer of information from the computer may be done by the ISDN line 104 and the central office switch 110, for example, to an ISDN line 103 to ISDN station 120 which includes an interface connection to the display. The data may be transferred simultaneously with an active call established between an ISDN station 120 and switch 110 via ISDN line 103, since the ISDN line includes two separate channels. One of the channels may be used for data while the other is used for voice.

As part of normal monitoring of shared call appearance stations such as the principal to which the call has been placed, the computer receives and analyzes DISCONNECT messages as indicated in FIG. 6. Upon completion of the normal call monitoring for this message, an advance is made to block 750 to determine if the station number for the disconnected call is recorded in the Call Wait Table (Table 10). If the station to which this call pertains is not listed in that table, a return is made to the idle state via block 730. However, if the number of the principal to which the received DISCONNECT message pertains is in the table, the Call Wait Table entry is deleted in block 751 and a call is set up from the computer to that station by the transmitting of the normal ISDN messages necessary to set up a call as indicated in block 752. Thereafter, a transfer message is sent to the switch including the call reference value of the call set up by the computer and the call reference value of the held call, recorded in the Call Wait Table. This will cause the switch to connect the call which is on hold to the call placed by the computer, and to take down the connections between the switch and the computer. Thereafter, the computer will return to the idle state in block 730. In this manner the computer places an incoming call on hold and automatically connects the held call to the principal when the principal becomes available, based on information derived by the computer from the associated messages received by virtue of the shared called appearances. It is, of course, possible that the party on hold will disconnect before the principal disconnects from the existing telephone call. In that event, the computer will receive a normal DISCONNECT message, and delete the Call Wait Table entry. A further display message informing the principal of the disconnect may also be sent.

In addition to the functions described above, the computer 101 has the capability of providing for a principal a list of incoming calls which were not answered. This may be desirable for some principals as an alternative to call forwarding. This list is compiled on the basis of information taken from the Call Log in the memory 310 (Table 5) which records all calls. Table 1 shows that in the event of a call terminated to a principal station, the computer receives an ASSOCIATED (CONNECT) message when the connection is fully established, i.e., when the called party goes off hook. When either party of the call disconnects, the computer receives the DISCONNECT message. The ASSOCIATED (CONNECT) message is not received by the computer if the principal station does not answer. However, the DISCONNECT message will be received when the calling party disconnects. The monitoring function of the computer for the ASSOCIATED (CONNECT) message described earlier herein, with respect to FIG. 4 includes a step in block 453 of writing the calling number in the Call Log (Table 5) together with other data. Thus, where the principal station does not answer, this entry will not be made. However, a corresponding entry will be made in the Call Log in response to the DISCONNECT message when the calling party disconnects. As indicated in block 439 in FIG. 6, the calling number associated with the DISCONNECT message is read from the State Table (Table 3) since the calling number information is typically not included in the DISCONNECT message. In block 448 the calling number is entered in the Call Log together with an indication of time and a station number call reference and the fact that it is the end of the call. The computer, by reading the Call Log readily determines the calls for which there is an ending time but no beginning time. For example, in Table 5 the last entry would indicate such a call. While the Call Log does not indicate whether the ending time entry pertains to an incoming or outgoing call, that information can be obtained by the computer from the State Change Table (Table 4). This table indicates a change from the ringing state to the idle state, when a call is not answered. The appropriate entry of the State Change Table is determined from the station number and the associated time entry.

Figure 12:
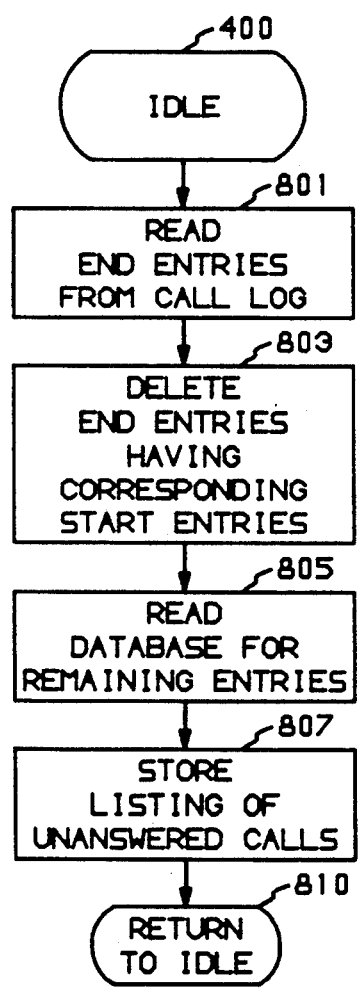

In this illustrative system, Call Log entries for outgoing calls are made in response to the ALERTING message, which in the normal operation will always be followed by a DISCONNECT message. Thus, any Call Log entry which has an End entry only, can be assumed to be an incoming call which was not answered. In an abnormal case where an outgoing call is started, but disconnected before the Alerting State, and End entry may be found without a corresponding Start entry. However, no Far Party number will be recorded, in such a case, in the Call Log. FIG. 12 shows a sequence of steps executed by the computer to generate a list of unanswered calls and store the list in the memory 310 of the computer. Block 400 in FIG. 12 represents the idle state of the computer 101. Block 801 represents the start of the sequence executed in the creation of a list of unanswered calls. The sequence may be initiated in response to a message from a keyboard connected to the computer or in response to a timing signal from clock 315. In block 801 the computer reads and records all of the "End" entries of the Call Log in memory 310 (Table 5). Thereafter, in block 803 the computer deletes from the recorded list all the "End" entries having corresponding "Start" entries. The result is a listing of unanswered incoming calls. It is not uncommon to have a data base, which may be part of memory 310, which lists the names and related data with the telephone number, for example, for employees of a corporation or for other persons who frequently call the principal. In block 805 the computer reads such a data base and obtains from the data base the available information corresponding to any of the calling numbers involved in the unanswered calls. In block 807 the computer stores the unanswered calls in the unanswered call list in the memory 310 and returns to idles via block 810.

Figure 13:
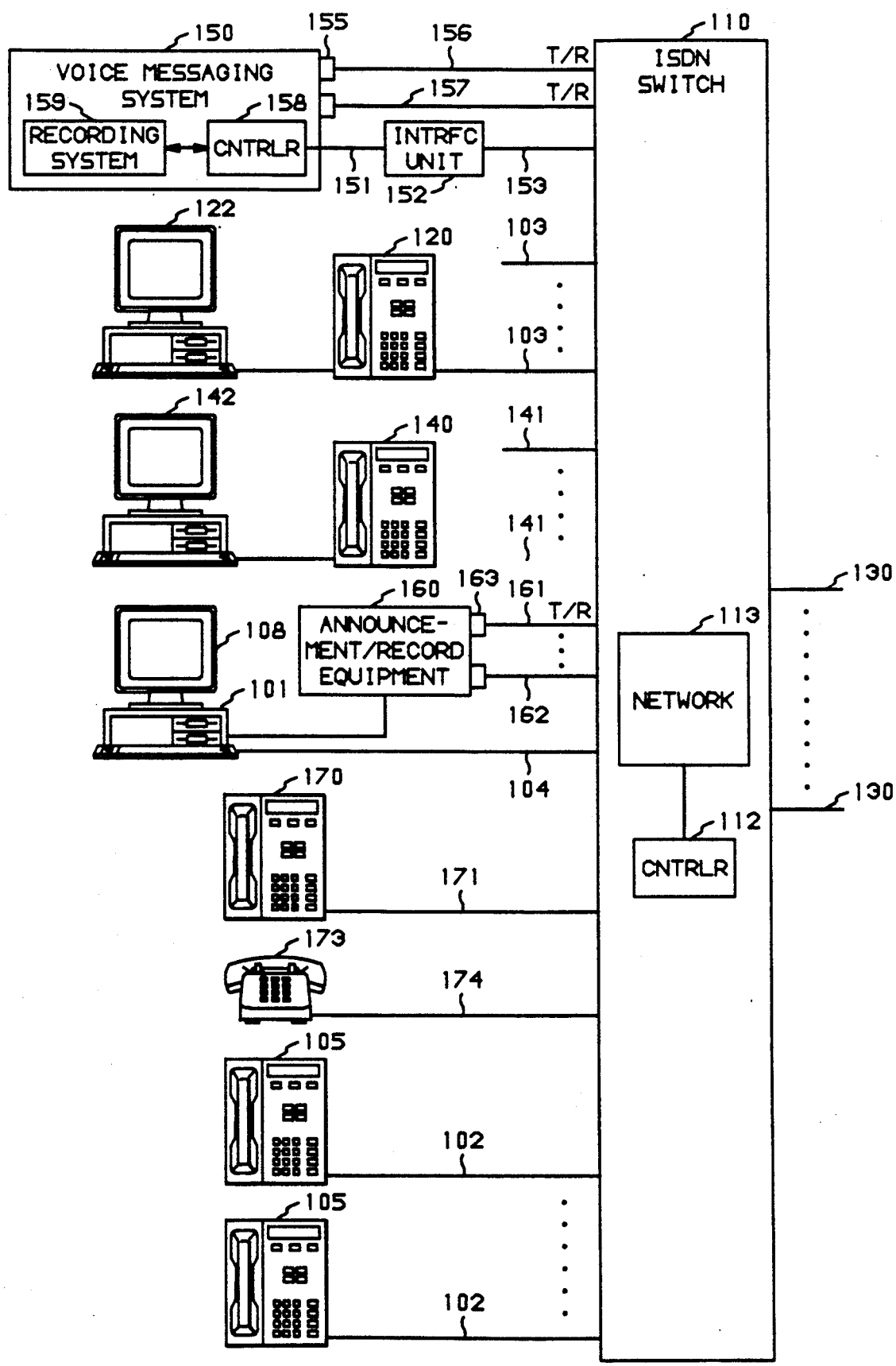
FIG. 13 is a representation of an ISDN switch with a connected voice messaging system and analog as well as ISDN phones.

FIG. 13 includes enhancements of FIG. 1 necessary to use the system for offering voice message service. FIG. 13 includes the components of FIG. 1 with a number of additions. Two blocks are shown for providing the actual voice message service. An enhancement of the announcement equipment 109 is shown as block 160, announcement/record equipment, for providing voice messaging under the control of PC 101. In addition, a standard voice messaging system 150 such as the Audix system manufactured by AT&T Technologies, Inc. is shown for providing voice message service. In practice, in any particular system, either block 160 or block 150 would be provided for a given customer, but not both.

The announcement/record equipment 160 is connected to ISDN switch 110 by ordinary analog lines called, for convenience, T/R(Tip/Ring) lines in conformance with standard telephone terminology. The announcement/record equipment 160 is connected to ISDN switch 110 via T/R lines 161, . . . , 162. The directory numbers of the group of lines 161, . . . , 162 served by block 160 for the message recording function are also assigned to BRI line 104 using the shared directory number feature. An interface circuit such as block 163 is used to interface announcement/record equipment 160 with T/R line 161. This interface circuit includes a facility for detecting dual tone multifrequency (DTMF) signals keyed by customers. It also converts the analog speech received over T/R line 161 into digital signals for storage in announcement/record 160. Units such as block 163 are commercially available. One such unit that is commercially available is a voice/power card manufactured by AT&T Technologies, Inc.

Voice messaging system 150 is a standard voice messaging system which interfaces with ISDN switch 110 over T/R lines 156, . . . , 157, and over ISDN line 153. The directory numbers associated with 156, . . . , 157 are also assigned to BRI line 153 using the shared directory number feature. T/R line 156 interfaces with standard voice messaging system 150 using an interface circuit 155 similar to the interface circuit 163. The standard voice messaging system accepts signals in an industry standard format known as simplified message service interface (SMSI) protocol over data line 151. The ISDN switch provides signals using ISDN protocol over basic rate interface (BRI) 153. To convert between the signals required for SMSI line 151 and BRI line 153, a conversion box 152 is inserted to interface between these two lines. This block is shown in greater detail in FIG. 14.

Also shown in FIG. 13, is an ISDN phone 170, similar to the phone 105, and an analog phone 173. The latter is a simple telephone set such as the 2500 telephone set manufactured by AT&T Technologies, Inc. Calls to busy or unanswered telephone 172 are forwarded to T/R lines 156, . . ., 157 or 161, . . ., 162 associated with one of the voice messaging systems 150 or 160. For the message retrieval function, the retrieving station is directly connected over one of the T/R lines to one of the voice messaging systems.

Lines 161, . . ., 162 or the comparable lines 156, . . ., 157 are each in a hunt group so that when the voice messaging system is accessed, any available one of these lines can be used to connect ISDN switch 110 to the voice messaging system. The listed directory number of that hunt group is the directory number of the voice messaging system, i.e., the directory number used for retrieving messages.

Standard voice messaging system 150 comprises a controller 158 and a recording system 159. The controller interfaces with the SMSI signals received over data link 151 and uses these signals to control the recording system 159. In the case of announcement/record equipment 160, which is comparable to the recording system 159, the controller is PC 101 which receives control signals over the BRI.

Figure 14:
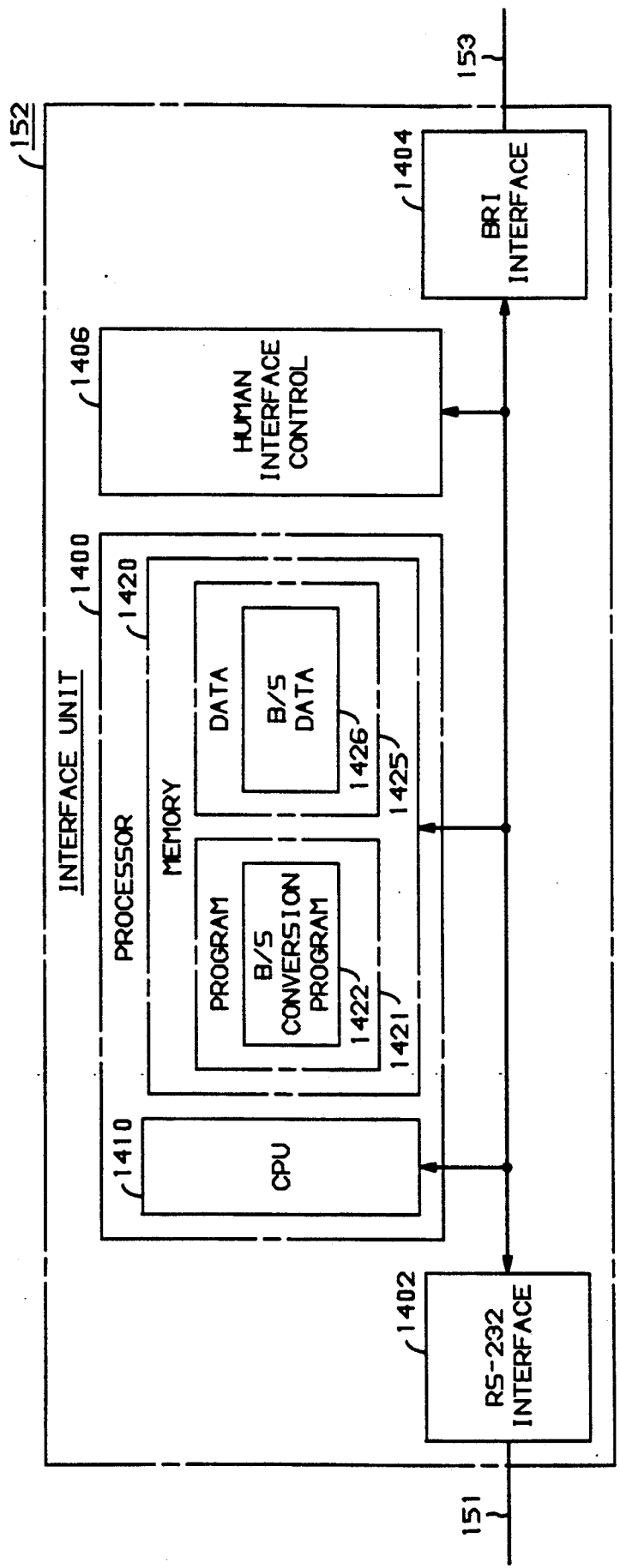
FIG. 14 is a block diagram of an interface between the ISDN switch and the voice messaging system.
Figure 15:
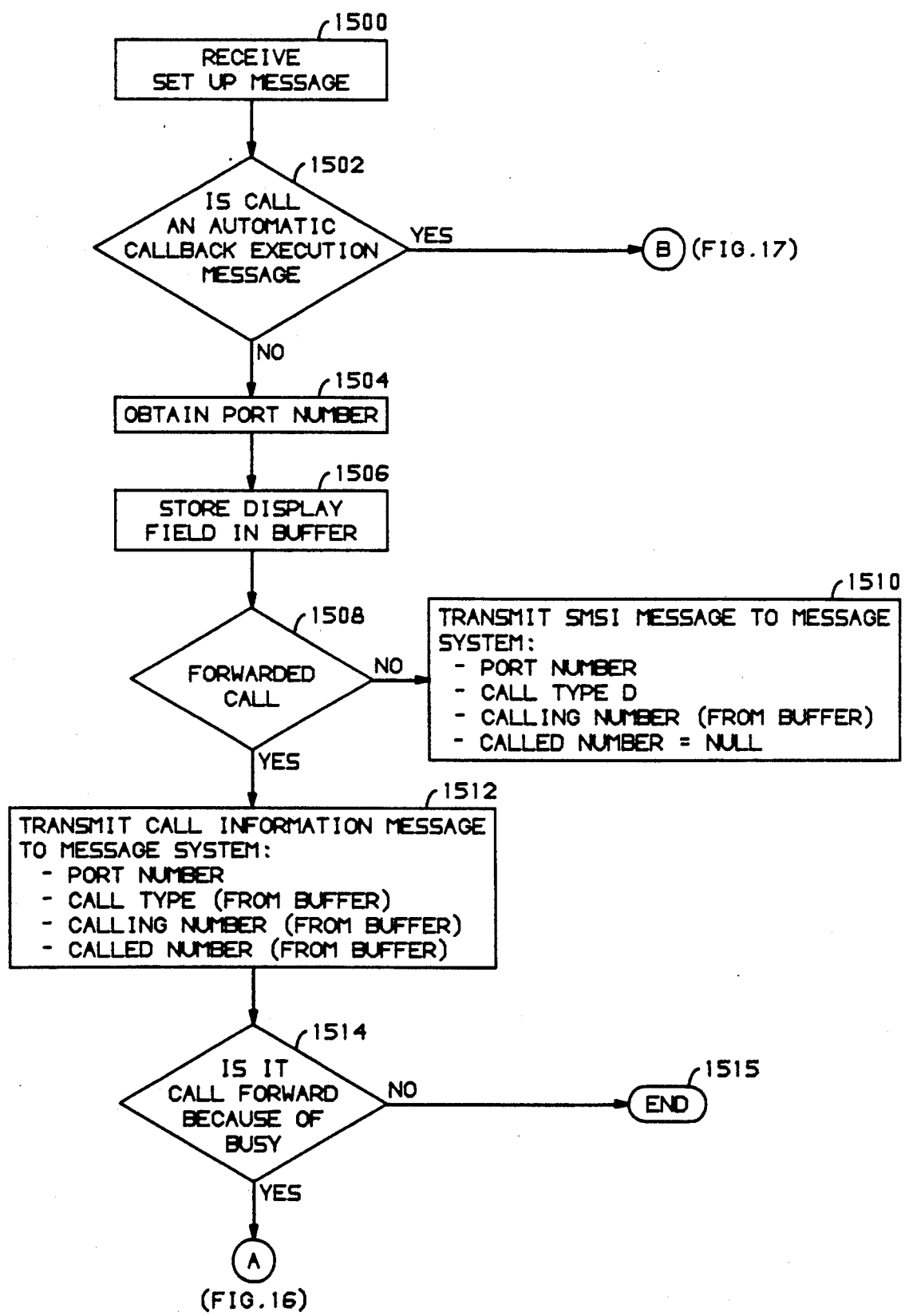
FIGS. 15 through 18 are flow chart representations of call handling functions performed by the processor of the switch and the processor of the message system.
Figure 16:
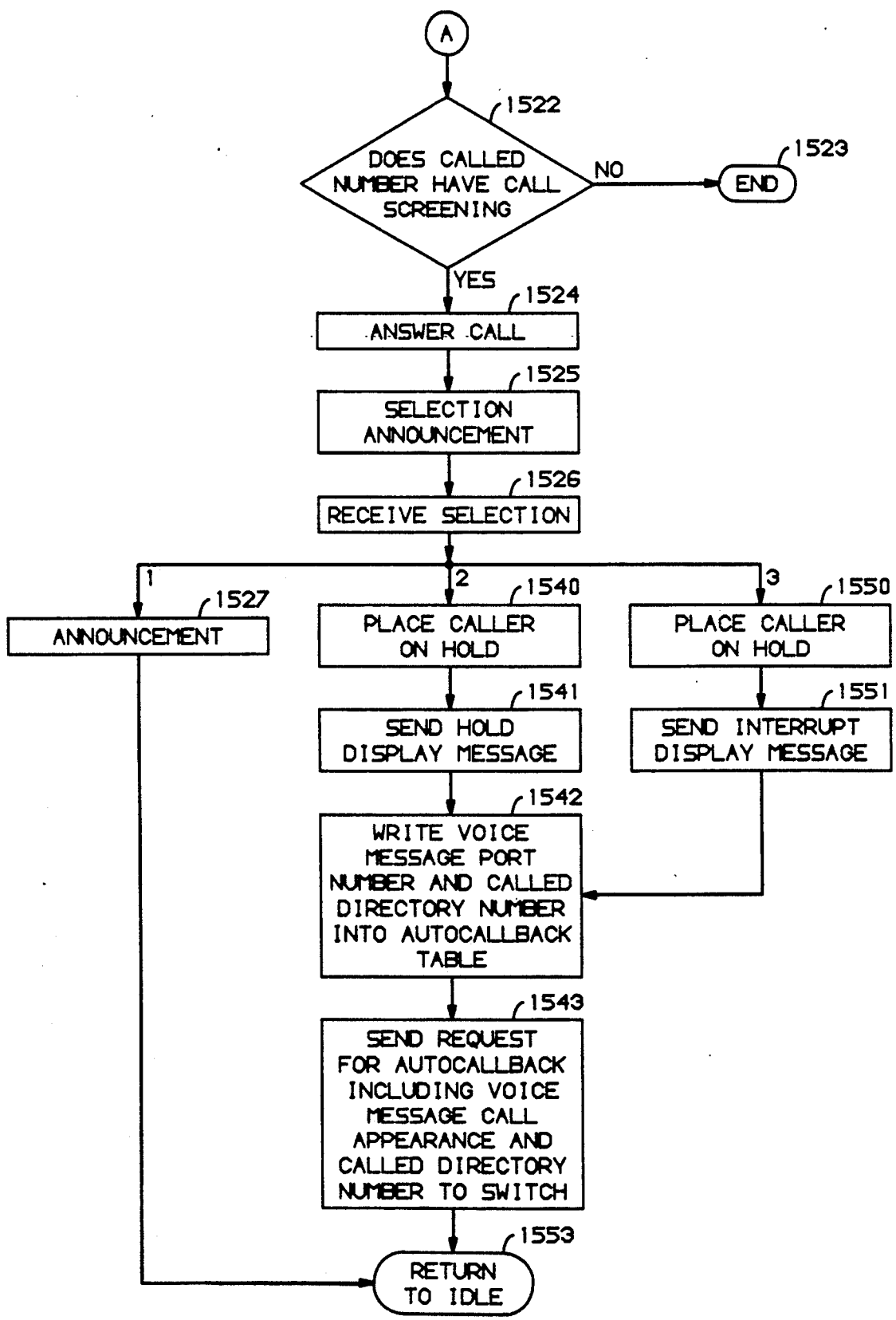

Block 152 is simply a conventional ISDN phone equipped with a special program and special data to perform the conversion between BRI signals and SMSI signals. FIG. 14 shows details of block 152. An RS 232 interface 1402 interfaces with data link 151 for receiving and transmitting data messages in the SMSI protocol. A Basic Rate Interface (BRI) 1404 interfaces with the BRI line 153 connected to ISDN switch 110. A human interface control 1406 is used to control displays on the ISDN telephone set and to detect the keying of information on that set. The processor 1400 is used to control the RS 232 interface 1402, BRI interface 1404, and the human interface control 1406, and is connected to these units. Processor 1400 comprises a central processing unit 1410 and a memory 1402. Parts of the memory may be in the form of permanent read-only memory (ROM) or electronically programmable read-only memory (EPROM) and other parts are writeable random access memory (RAM). The program 1421 of the processor has been enhanced with a program for carrying out the BRI to SMSI conversion (program block 1422). The data block 1425 includes data block 1426 which contains data necessary for the BRI/SMSI protocol conversion.

The use of announcement/record equipment 160 controlled by PC 101 offers a number of advantages over the use of voice messaging system 150. These advantages stem from the fact that the PC 101 has access to the features offered by ISDN. For example, voice messaging system 150 is limited to distributing voice messages within a certain community. The announcement/record equipment 160 under the control of PC 101 is less limited in that it can transmit data, in this case packetized voice, to another ISDN switch for subsequent retransmission to users of that other switch. Further, a call screening type of service can be provided by PC 101 to units such as phones 170 and 173 by using an ISDN callback feature.

FIG. 15 through 18 are flow charts showing how voice messaging can be provided in this system. In the flow charts of FIGS. 15–18, the assumption is made that standard voice messaging 150 and protocol converter 152 are being used. Where a system implemented using the announcement/record equipment 160 under the control of PC 101 uses a different method of operation, this will be noted.

The process starts (FIG. 15) when the converter 152 receives a setup message (action block 1500). Test 1502 tests whether the call is an automatic callback execution message. If so, then the actions shown on FIG. 17, to be described hereafter, will be performed. If not, then the port number is obtained from the setup message (action block 1504). The lines 156, . . ., 157 form a share call appearance with BRI 153 so that all messages for ports 156, . . ., 157 are automatically sent over BRI 153 to block 152. The port number is one of the ports 156, . . ., 157 and is found in the call appearance number field of the setup message. The port number is obtained using a table (not shown) to translate between the call appearance and a port number, the port number being an internal number used by the voice messaging system, the call appearance being the number used by the ISDN switch. The display field of the message which contains the calling number, a called number, and call type are then stored in the memory of block 152 (action block 1506). Block 152 tests whether the call is a forwarded call by checking the call type field of the setup message (test 1508). If the result of the test indicates that this is not a forwarded call, then an SMSI message is transmitted (action block 1510) by block 152 to the voice message system 150 comprising a port number, calling number, and call type obtained in action blocks 1504, 1506 and 1508.

Appendix A taken from an AT&T interface specification document with the identifying number CIR (Customer Information Release) 533-099-001TD specifies the SMSI message layout. Table A and its description specifies the SMSI output messages call information layout. Table B and its accompanying description specifies the message waiting indicator failure message layout. Table C specifies the SMSI input messages message waiting indicator active message layout. Table D specifies the SMSI input messages message waiting indicator deactivate message layout.

The port number and the calling number are obtained from storage having been stored by the actions of block 1506 and the called number is treated as being null. The call type inserted into the SMSI message in action block 1510 is call type D (direct).

If this is a forwarded call, then the call information is transmitted on block 152 to the message system 150. This message includes the port number previously obtained in action action block 1504, the call type previously stored in block 1506, the calling and called number also previously stored in block 1506. In action block 1512, which is used for call forward on busy, call forward all calls, and call forward/no answer, these features are represented by the letters B, A, and N, respectively, as indicated in Table A of the Appendix. The messages transmitted in action blocks 1510 and 1512 are internal messages for the system in which the announcement/record 160 is used under the control of PC 101.

Test 1514 is used to determine whether this call is for the condition of call forward because of busy (B). If not, actions have been completed (end block 1515). The additional actions of blocks 1522-1553 (FIG. 16) can only be performed by the PC 101 controlling announcement/record equipment 160 because the standard voice messaging system 150 is not prepared to request the automatic callback that is required to implement screening. If the voice messaging is provided by the former type of arrangement, then test 1522 checks whether the called number has call screening. If not, this is the end of these actions (end block 1523). If so, then the announcement/record equipment 160 answers the call on one of its ports such as 163 (action block 1524). The announcement equipment announces (action block 1525) the message asking the customer to select one of the three calling customer options. The caller keys one of the three selections (action block 1526). If the caller has keyed in a request simply to leave a message, then the announcement prompting the customer to leave the message is returned (action block 1527). If the caller wishes to be placed on hold, then the caller is placed on hold (action block 1540) and a message is sent to the called customer indicating that there is another party on hold; this is then displayed on the called customer's station (action block 1541). If the caller chooses the third option, then the caller is placed on hold (action block 1550) and a special message is sent to the called customer indicating that a caller is on hold and wishes to interrupt the called customer's present conversation (action block 1551). This is displayed on the called customer's station. For the two situations in which the caller is placed on hold, a voice message port number and the called customer's directory number is written into the auto-callback table of PC 101 (action block 1542) and a request is sent to switch 110 for an automatic callback (action block 1543); the request includes the voice message administrative call appearance and the called customer's directory number. After sending this request, the process returns to idle (action block 1553).

Figure 17:
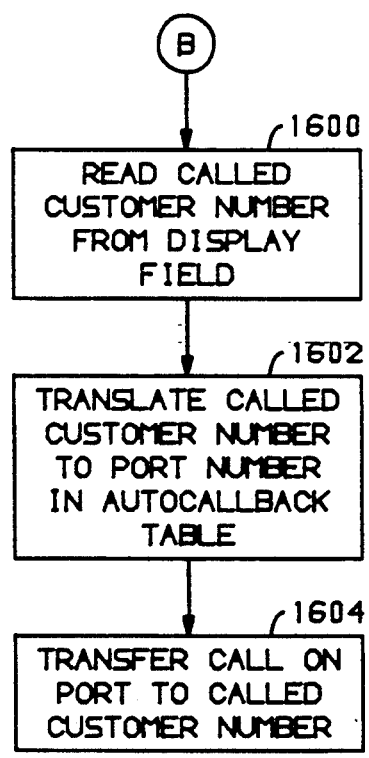

FIG. 17 illustrates the actions performed by PC 101 if the setup message is an automatic callback execution message. These actions can only be performed under the control of PC 101 and cannot be performed by the voice messaging system 150 or the interface 152. If the setup message is an automatic callback execution message, then the called customer's directory number is read from the display field (action block 1600). PC 101 checks in its automatic callback table to translate the called customer's directory number to the port number to which the caller has been connected during the whole interval (action block 1602). PC 101 then initiates actions by the announcement/record equipment 160 to have the call on that port transferred to the called customer's number (action block 1604).

Figure 18:
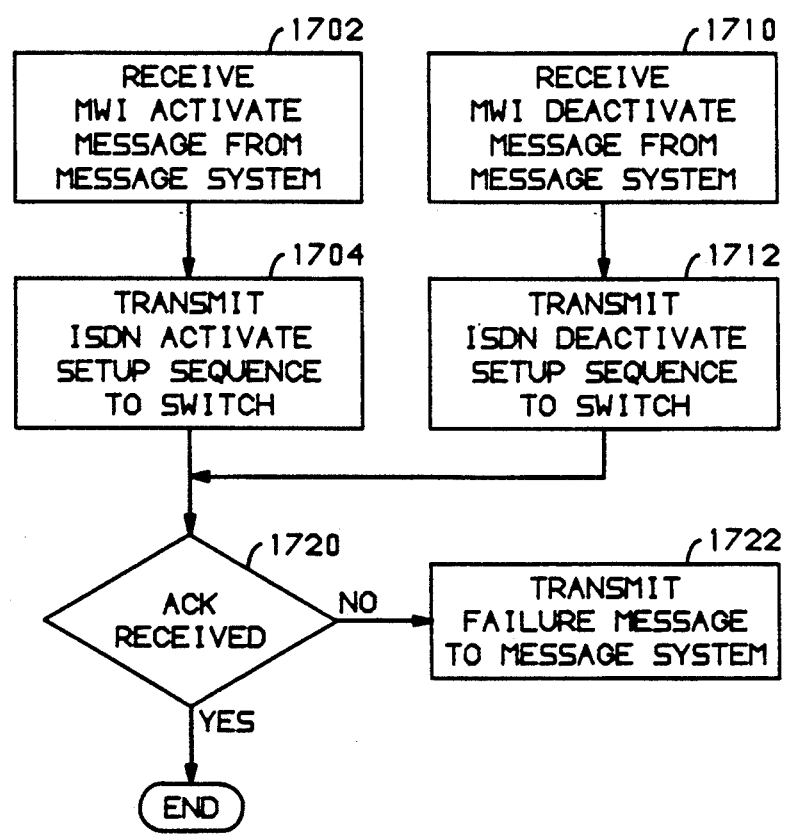

FIG. 18 illustrates the actions required to control the message waiting indicator of the stations connected to ISDN switch 110. These actions are performed by interface block 152 interfacing between ISDN switch 110 and voice messaging system 150 (action block 1702). Block 152 receives a message waiting indicator activate message of a type described in Table C of the Appendix from the voice message system 150. It translates this message and transmits an ISDN setup message for activating the message waiting indicator to switch 110 (action block 1704). This is described in the BRI Reference Specification pages V 57 and IV 44-46.

In action block 1710, interface unit 152 receives a message waiting indicator de-activate message of a type described in Table D of the Appendix from the message system 150. Interface unit 152 then transmits a setup message for deactivating the MWI message waiting indicator to switch 110 (action block 1712). Following execution of action block 1704 or 1712, interface unit 152 waits for an acknowledgment and tests whether the acknowledgement has been received (test 1720). If so, this is the end of the process. If not, a failure message of a type described in Table B of the Appendix is sent to voice messaging system 150 (action block 1722). If the voice messaging function is performed by announcement/record equipment 160 under the control of PC 101, then the actions of FIG. 18 are performed by PC 101. Blocks 1702, 1710, and 1722 are performed by sending internal messages within PC 101. Blocks 1704 and 1712 are performed in essentially the same way as they are performed by interface unit 152.

In order to control announcement/record equipment 160 from PC 101, the memory of PC 101 is expanded to include memory for controlling the announcement/record equipment for performing the voice messaging function. This additional memory is essentially the same as the memory required for controlling voice messaging system 150.

It is to be understood that the above-described arrangement is merely an illustrative application of the principals of the invention. Numerous other arrangements may be devised by those skilled in the art without departing from the spirit and scope of the invention.

TABLE 1

| MESSAGE FLOW ON THE AGENT STATION | DIRECTION | MESSAGES RECEIVED BY THE COMPUTER | FUNCTION STATEMENT |
|---|---|---|---|
| CALL ORIGINATIONS: | | | |
| SETUP | STATION→SWITCH | | |
| SETUP_ACK | SWITCH→STATION | ASSOCIATED (SETUP) | DIALING |
| CALL_PROCEEDING | SWITCH→STATION | | |
| ALERTING | SWITCH→STATION | ALERTING | FAR END ALERTING |
| CONNECT | SWITCH→STATION | CONNECT | TALKING |
| CONNECT_ACK | STATION→SWITCH | | |
| DISCONNECT | SWITCH→STATION or STATION→SWITCH | DISCONNECT | RETURN TO IDLE |
| CALL TERMINATIONS: | | | |
| SETUP | SWITCH→STATION | SETUP | RINGING |
| ALERTING | STATION→SWITCH | | |
| CONNECT | STATION→SWITCH | ASSOCIATED (CONNECT) | TALKING |
| DISCONNECT | SWITCH→STATION or STATION→SWITCH | DISCONNECT | RETURN TO IDLE |
| FEATURE ACTIVITIES: | | | |

TABLE 1-continued

| MESSAGE FLOW ON THE AGENT STATION | DIRECTION | MESSAGES RECEIVED BY THE COMPUTER | FUNCTION STATEMENT |
|---|---|---|---|
| HOLD | STATION→SWITCH | | |
| HOLD_ACK | SWITCH→STATION | ASSOCIATED (HOLD) | HOLD |
| RECONNECT | STATION→SWITCH | | |
| RECONNECT_ACK | SWITCH→STATION | ASSOCIATED (RECONNECT) | TALKING |

TABLE 2

Message Information Elements
Protocol Discriminator
Call Reference
Message Type
Bearer Capability
Channel Identification
Progress Indicator
Terminal Capapbilities
Keypad
Signal
Switchhook
Locking Shift
Selected Call Appearance
Origination Call Appearance
Destination Call Appearance
Display Field
Feature Activation
Feasture Indication
Adjunct Control

TABLE 3
STATE TABLE

| Station Number | Call Appearance (CA)# | State | Call Reference (CR) Value | Calling Number |
|---|---|---|---|---|
| 555-6012 | 4 | Idle | — | |
| 555-6013 | 5 | Dialing | 28 | |
| 555-6014 | 6 | Dialing Complete | 21 | |
| 555-6015 | 7 | Ringing | 4 | 312-555-7000 |
| 555-6016 | 8 | Talking | 72 | |
| 555-6017 | 9 | Far End Alerting | 61 | |
| 555-6018 | 10 | Hold | 15 | |

TABLE 4
STATE CHANGE TABLE

| Date | Time | Station # | State Change |
|---|---|---|---|
| 12/05/88 | 1:52:45 | 555-6012 | Idle to Dialing |
| 12/05/88 | 1:53:00 | 555-6012 | Dialing to Far-End-Alert |
| 12/05/88 | 1:53:40 | 555-6012 | Far-End-Alert to Talk |
| 12/05/88 | 2:05:17 | 555-6012 | Talk to Idle |
| 12/05/88 | 2:15:01 | 555-6017 | Idle to Ring |
| 12/05/88 | 2:16:02 | 555-6017 | Ring to Idle |

TABLE 5
CALL LOG

| Date | Time | Station # | Direction | Start/End | Far Party | Call Ref. |
|---|---|---|---|---|---|---|
| 12/05/88 | 1:12:05 | 555-6015 | Incoming | Start | 312-555-7000 | 4 |
| 12/05/88 | 1:53:00 | 555-6012 | Outgoing | Start | 712-5053 | 3 |
| 12/05/88 | 2:05:07 | 555-6015 | | End | 312-555-7000 | 4 |
| 12/05/88 | 2:05:17 | 555-6012 | | End | | 3 |
| 12/05/88 | 2:16:02 | 555-6017 | | end | 312-555-7000 | 9 |

TABLE 6
STATION ACTIVITY DATA

| Measurement | Station 6012 | Station 6013 | Station N |
|---|---|---|---|
| No. of IN calls | X | X | X |
| No. of OUT calls | X | X | X |
| Total No. of calls | X | X | X |
| Average Holding Time IN calls | X | X | X |
| Average Holding Time OUT calls | X | X | X |

TABLE 6-continued
STATION ACTIVITY DATA

| Measurement | Station 6012 | Station 6013 | Station N |
|---|---|---|---|
| Average Holding Time ALL calls | X | X | X |
| % of time spent in IN calls | X | X | X |
| % of time spent in OUT calls | X | X | X |
| time spent in idle state | X | X | X |

TABLE 7
CALL TRANSFER STACK

| # | Original Calling Station | Original Called Station | Transferred From | Call Type | Transferred To |
|---|---|---|---|---|---|
| 1 | 979-4240 | 555-6012 | 555-6020 | Ext | 555-6015 |
| 2 | 965-4000 | 555-6013 | 555-6020 | Ext | 555-6016 |
| 3 | 685-4112 | 555-6014 | 555-6020 | Ext | 555-6015 |

TABLE 8
CALL INTERCEPT TABLE

| Called Station # | Call Type | Calling Number | Call Screen | Timer | Transfer To |
|---|---|---|---|---|---|
| 555-6012 | Busy | — | Yes | — | — |
| 555-6012 | Int | — | — | 20 sec. | 555-6019 |
| 555-6012 | Ext | — | — | 20 sec, 10 sec | 555-6015, 555-6016 |
| 555-6013 | — | 682-3785 | — | — | 653-1240 |
| 555-6014 | Busy | — | — | — | 555-6015 |

TABLE 9
TIMER TABLE

| Timer # | CR # | Station # | Calling # | Transfer To | Call Type |
|---|---|---|---|---|---|
| 1 | 4 | 555-6012 | 979-4240 | 555-6015 | Ext |

TABLE 10

CALL WAIT TABLE

| Incoming CR | Called Station |
|---|---|
| 8 | 555-6016 |

APPENDIX A

SIMPLIFIED MESSAGE SERVICE INTERFACE INTERFACE SPECIFICATIONS TABLES

TABLE A

Simplified Message Service Interface - Output Messages
Call Information - Message Layout

| Field # | Length | Description | Value |
|---|---|---|---|
| 1 | 2 | Start of Message | \<Cr>\<LF> |
| 2 | 2 | Message Type | "MD" |
| 3 | 3 | Line Group | 001-063 |
| 4 | 4 | Line Number | 0001-2047 |
| 5 | 1 | Call Type | "A", "B", "D", OR "N" |
| 6 | 0 or 7 | Called Station Number | NULL/0000000-9999999 |
| 7 | 1 | Field Separator | \<SP> |
| 8 | 0 or 7 | Calling Station Number | Null/0000000-9999999 |
| 9 | 2 | End of Message | \<CR>\<LF>\<CNTRL Y> |

Message Description

The ESS switch sends the call information message to the answer bureau. The characters "MD" identify the message as a call information message. The line group and number identify the attendant receiving the call. The call type signifies whether the incoming attendant call was: (A) forwarded unconditionally. (B) forwarded by Call Forwarding Busy Line, (D) Direct call or (N) forwarded by Call Forwarding Don't Answer.

For a forwarded call, the Called Station Number identifies the station whose call was forwarded to the attendant, the field separator will be \<SP>, and the Calling Station Number identifies the calling party (if available). The Calling Station Number field will be NULL if the calling party information is unavailable.

For a direct call to the attendant, the Called Station Number will be NULL, the field separator will be \<SP>, and the Calling Number identifies the calling party.

TABLE B

Simplified Message Service Interface - Output Messages
Message Waiting Indicator Failure - Message Layout

| Field # | Length | Description | Value |
|---|---|---|---|
| 1 | 2 | Start of Message | \<CR>\<LF> |
| 2 | 3 | Message Type | "MWI" |
| 3 | 7 | Called Station Number | 0000000-9999999 |
| 4 | 1 | Field Separator | \<SP> |
| 5 | 3 | Error Type | "INV" or "BLK" |
| 6 | 3 | End of Message | \<CR>\<LF>\<CNTRL Y> |

Message Description

The Message Waiting Indicator failure message is sent by the ESS switch to the answer bureau. This message contains information about a MWI activation or deactivation request for the specified calling station number that failed because of blocking (BLK) or an invalid command (INV). If the failure reason is INV, it means an invalid MWI command (invalid calling station number) has been sent. If the failure reason is BLK, it means to retry the MWI activate/deactivate command because of switch blocking.

TABLE C

Simplified Message Service Interface - Input Messages
Message Waiting Indicator Activate - Message Layout

| Field # | Length | Description | Value |
|---|---|---|---|
| 1 | 2 | MWI State | "OP" |
| 2 | 1 | Field Separator | ":" |
| 3 | 3 | Message Type | "MWI" |
| 4 | 1 | Field Separator | \<SP> |
| 5 | 7 | Station Number | 0000000-9999999 |
| 6 | 2 | End of Message | "!" \<CNTRL-D> |

Message Description

The characters "OP:MWI" identify this message as a Message Waiting Indicator (MWI) activation request. This message Waiting is a Message Waiting Indicator (MWI) activate request for the station specified by the directory number in field 5. The answer bureau sends this message to the ESS switch whenever it wishes to activate the Message Waiting Indicator for the specified station number.

TABLE D

Simplified Message Service Interface - Input Messages
Message Waiting Indicator Deactivate - Message Layout

| Field # | Length | Description | Value |
|---|---|---|---|
| 1 | 3 | MWI State | "RMV" |
| 2 | 1 | Field Separator | ":" |
| 3 | 3 | Message Type | "MWI" |
| 4 | 1 | Field Separator | \<SP> |
| 5 | 7 | Station Number | 0000000-9999999 |
| 6 | 2 | End of Message | "!" \<CNTRL-D> |

Message Description

The characters "RMV:MWI" identify the message as a Message Waiting Indicator deactivation request. This message is a Message Waiting Indicator (MWI) deactivate request for the station specified by the directory number in field 5. The answer bureau sends this message to the ESS switch whenever it wishes to deactivate the Message Waiting Indicator for the specified station number.

We claim:

1. Automated call handling apparatus for use with a telecommunication switching system transmitting associated messages corresponding to call handling information exchanged between said switching system and a telephone station connected thereto, comprising:

means for connecting said apparatus to said system; and means responsive to certain of said associated messages indicating an incoming call to said telephone station for selecting an alternate destination for said call and for transmitting to said switching system digital messages for causing said switching system to transfer said call to said selected alternate destination.

2. Automated call handling apparatus in accordance with claim 1, wherein said switching system comprises a plurality of subscriber lines, wherein said station is connected to one of said subscriber lines and wherein said means for selecting is responsive to associated messages transmitted on another of said subscriber lines.

3. Automated call handling apparatus in accordance with claim 2, wherein said another subscriber line is an ISDN subscriber line and said means for selecting is responsive to ISDN shared call appearance associated messages.

4. Automated call handling apparatus in accordance with claim 1, further comprising means for recording information defining different alternate destinations for different types of calls to said station and wherein said means for selecting selects said alternate destination on the basis of said recorded information and call type information defined by said associated messages.

5. Automated call handling apparatus in accordance with claim 1, further comprising means for recording information defining the identity of certain calls to said station to be forwarded and wherein said means for selecting is responsive to said recorded information and data defined by said associated messages identifying one of said certain calls to select said alternate destination.

6. Automated call handling apparatus in accordance with claim 1, further comprising:
   means for recording a first and a second alternate destination for calls directed to said telephone station; and
   means for recording the identity of calls forwarded to a first alternate destination; and
   wherein said means for selecting is responsive to said certain of said associated messages for selecting said second alternate destination when said certain associated messages define data identified in said means for recording as relating to a call having been previously forwarded to said first alternate destination.

7. Automated call handling apparatus in accordance with claim 1, further comprising;
   memory means for recording information defining call activity status of said alternate destination; and
   wherein said means for selecting is responsive to certain of said associated messages for recording said status information in said memory means and responsive to other of said associated messages and to said recorded information to transmit said digital messages for causing said switching system to connect said call to said selected alternate destination only when the recorded information indicates that the alternate station is idle.

8. Automated call handling apparatus for use with a telecommunication switching system, said system transmitting associated messages corresponding to call handling information exchanged between said switching system and a telecommunication station connected to said system, comprising:
   computing means;
   data recording means for recording data; and
   means for connecting said computing means to said system;
   said computing means responsive to said associated messages for recording in said recording means data defining call activity for said station and data defining unanswered calls to said station.

9. Automated call handling apparatus in accordance with claim 8, wherein said system comprises subscriber lines for connection to said system and said station is connected to one of said subscriber lines, and wherein said computing means is responsive to associated messages transmitted on another of said subscriber lines.

10. Automated call handling apparatus in accordance with claim 9, wherein said other subscriber line is an ISDN line and said computer means is responsive to ISDN shared call appearance associated messages.

11. Call forwarding apparatus for use with a plurality of telecommunication switching systems, each of said systems transmitting associated messages corresponding to call handling information exchanged between said switching systems and telecommunication stations connected to said systems, said apparatus comprising:
   computer means; and
   means for connecting said computer means to each of said systems;
   said computer means responsive to associated messages from one of said systems indicating an incoming call to a station connected to said one system for selecting for said call an alternate destination station connected to another of said systems, and for transmitting to said one system call handling information for causing said one system to connect said call to said alternate destination station connected to said other system.

12. Call forwarding apparatus in accordance with claim 11, wherein said telecommunication systems are ISDN systems and said computer means is responsive to ISDN shared call appearance associated messages.

13. Call forwarding apparatus in accordance with claim 11 further comprising means for recording information defining different alternate destinations for different types of calls to said station connected to said one system, and wherein said computer means selects said alternate destination station on the basis of said recorded information and call type information defined by said associated messages from said one system.

14. Call forwarding apparatus in accordance with claim 11 further comprising means for recording information defining the identity of certain calls to said station connected to said one system, and wherein said computer means is responsive to said recorded data and data defined by said associated messages identifying one of said certain calls to select said alternate destination station.

15. Call forwarding apparatus in accordance with claim 11, further comprising:
   means for recording information defining call activity status for said alternate destination station; and
   wherein said computer means is responsive to certain of said associated messages for recording said status information in said memory means and responsive to other of said associated messages and said recorded information for transmitting said call handling information for causing said one system to connect said call to said alternate destination station only when said recorded information indicates that said alternate station is idle.

16. Automated call handling apparatus for use with a telecommunication switching system, transmitting associated messages corresponding to call handling information exchanged between said switching system and a telecommunication station connected to said system, said system responsive to an incoming call to forward said call to a predetermined subscriber number when said station is busy, said apparatus comprising:
   computer means; and
   means for connecting said computer means to said system;
   said computer means responsive to a call forwarded to said predetermined number and to said associated messages to transmit to said switching system call handling information for causing said system to connect said call to said station when said station is no longer busy.

17. Automated call handling apparatus in accordance with claim 16 and further comprising recorded announcement means, and wherein said computer is responsive to said forwarded call to connect said call to said announcement means prior to transmitting said call handling information and is responsive to information received in response to connecting said call to said announcement means for transmitting a call waiting indication to said station.

18. A method of forwarding telephone calls in a computer connected to a switching system, comprising the steps of:
receiving at said computer associated messages corresponding to call handling messages exchanged between said system and a predetermined station connected to said system;
in response to said associated messages, recognizing a message specifying an incoming call to said station;
selecting an alternate destination for said call; and
transmitting to said system digital messages for causing said system to forward said call to said selected alternate destination.

19. The method in accordance with claim 18, wherein the step of transmitting includes the step of transmitting a message for causing said system to set up a call between said computer and said selected alternate destination and the step of sending a message for causing said system to interconnect said incoming call and said call set up between said computer and said selected alternate destination.

20. A method of screening in a computer an incoming call for a predetermined station forwarded to said computer from a switching system connected to said computer and transmitting to said computer associated messages indicative of call handling information exchanged between said predetermined station and said switching system, comprising the steps of:
responsive to receipt of said incoming call answering said call by the computer;
following said answering by said computer, connecting said call to recorded announcement equipment connected to said computer;
in response to signaling received in association with said call, transmitting to said station a message indicating that a call is waiting; and
in response to an associated message from said switching system, transmitting to said system call handling messages for causing said system to connect said incoming call to said station.

21. A control interface for interfacing a telecommunication switching system with a message recording system, said telecommunication switching system providing information, including call destination information, on a shared directory number telephone line, in accordance with a standard telephone line protocol, for calls extended to said message recording system, said interface comprising:
means for connecting to said telephone line;
means for communicating with said message recording system in a message system protocol; and
control means responsive to said information received on said line in said standard telephone protocol, for extracting from said received information call destination information pertaining to a call extended to said message system and for transmitting said extracted call destination information to said message recording system via said means for communicating, using said message recording system protocol.

22. The interface in accordance with claim 21, wherein said telephone line is a standard ISDN line and means for connecting is a standard ISDN telephone set, incorporating ISDN line interface circuitry.

23. The interface in accordance with claim 22, wherein said ISDN telephone set comprises circuit means for converting from the ISDN protocol to an RS232 data protocol and circuit means for converting from said RS232 protocol to said message system protocol.

24. The interface in accordance with claim 21, wherein said call destination information comprises call appearance data, wherein said interface means further comprises memory means for storing directory number data in association with said call appearance data and said control means is responsive to said received information to obtain from said memory a directory number stored in association with call appearance data defined by said received information and to transmit said obtained directory number to said message recording system.

25. The interface in accordance with claim 24, wherein said telephone line protocol is the ISDN protocol and said message system protocol comprises the SMSI protocol.

26. The interface in accordance with claim 24, wherein said message system protocol requires a predetermined message format comprising a plurality of additional message elements and said control means is further responsive to said received information to generate said additional message elements and to transmit said additional message elements with said call appearance data to said message recording system.

27. The interface in accordance with claim 21, wherein said control means is responsive to information pertaining to calls forwarded to said message recording system for recording to transmit to said message recording system a message of a first type and responsive to information pertaining to calls directed to said recording system for message retrieval to transmit a message of a second type.

28. The interface in accordance with claim 21, wherein said control means is responsive to messages from said message recording system in said message recording system format to transmit messages to said telecommunication switching system in said telephone format.

29. The interface in accordance with claim 27, wherein said control means is responsive to a message waiting indicator activation message from said message recording system to transmit an ISDN message waiting indicator activation message on said telephone line and responsive to a message waiting indicator deactivation message from said message recording system to transmit an ISDN message waiting indicator deactivation message on said telephone line.

30. Apparatus for providing voice message service, comprising:
a switching system for serving integrated voice and data lines and analog lines;
a voice message system;
a plurality of analog lines, each having its own directory number, for connecting said switching system to said voice message system; and
an integrated voice and data line, sharing the directory numbers of the plurality of analog lines, for receiving display control data for each of said plurality of analog lines from said switching system for transmission to said voice message system, whereby said voice message system receives control data for calls on said analog lines from said integrated line.

31. The apparatus of claim 30 further comprising interface means, for interfacing between a data interface of said voice message system and said integrated line, for communicating data between said switching system and said voice message system.

32. In a switching system for serving analog lines and integrated voice/data lines and comprising a switching network and voice message system, a method of providing voice message service, comprising the steps of:
assigning a separate number to each of a plurality of analog lines connected between said switching network and said voice message system;
assigning all of said separate directory numbers to an integrated voice/data line connected between said switching network and said voice message system;
establishing a connection over one of said analog lines to said voice message system; and
in parallel with said establishing, and as a result of having a number assigned to said one analog line also assigned to said voice/data line, sending a data message over said voice/data line to said voice message system for providing data to control said voice message system.

33. The method of claim 32 wherein said sending comprises:
sending a data message in a telephone protocol to an interface system;
in said interface system, converting said data message to a message system protocol; and
sending said converted message from said interface system to said voice message system.

34. The method of claim 33 wherein said converting comprises:
receiving said data message in an ISDN telephone set;
performing a protocol conversion in said telephone set to an RS232 protocol; and
performing a protocol conversion from said RS232 protocol to said message system protocol.

* * * * *

UNITED STATES PATENT AND TRADEMARK OFFICE
CERTIFICATE OF CORRECTION

PATENT NO. : 5,023,868

DATED : June 11, 1991

INVENTOR(S) : Wayne A. Davidson, Diana S. Winter

It is certified that error appears in the above-identified patent and that said Letters Patent is hereby corrected as shown below:

Abstract page, right column, after the first paragraph of the Abstract add the following paragraph:
--In order to handle voice message recording, an ISDN line shares the directory numbers of the analog lines connecting a switch to a message recording system. The ISDN line then receives all messages destined for the lines connected to the message switch. The ISDN line is connected to an interface for converting between ISDN messages and data messages for controlling the message recording system. Advantageously, this permits an ISDN switch to provide an inexpensive interface to a voice message system.--

Signed and Sealed this

First Day of December, 1992

Attest:

DOUGLAS B. COMER

Attesting Officer

Acting Commissioner of Patents and Trademarks